United States Patent [19]

Mototake et al.

[11] Patent Number: 4,961,120

[45] Date of Patent: Oct. 2, 1990

[54] RECORDING AND/OR REPRODUCING APPARATUS WITH ROTARY HEAD FOR MAGNETIC TAPE CASSETTE

[75] Inventors: Tatsuya Mototake, Tokyo; Tatsuyuki Outou, Kanagawa; Yoshinori Yamamoto, Kanagawa; Kenji Kawakami, Kanagawa, all of Japan

[73] Assignee: Sony Corporation, Tokyo, Japan

[21] Appl. No.: 218,912

[22] Filed: Jul. 14, 1988

[51] Int. Cl.[5] .............................................. G11B 5/027
[52] U.S. Cl. .................................... 360/85; 360/96.3; 242/204
[58] Field of Search .......................... 360/85, 95, 96.3; 242/197–204

[56] References Cited

U.S. PATENT DOCUMENTS

| 4,121,267 | 10/1978 | Hayashi | 360/85 |
|---|---|---|---|
| 4,345,725 | 8/1982 | Kato | 242/204 |
| 4,370,682 | 1/1983 | Katoh | 360/85 X |
| 4,751,592 | 6/1988 | Hutter | 360/85 X |
| 4,796,116 | 1/1989 | Kwon | 360/85 |

FOREIGN PATENT DOCUMENTS

| 0160822 | 11/1985 | European Pat. Off. . |
|---|---|---|
| 0224673 | 10/1986 | European Pat. Off. . |
| 3022780 | 1/1981 | Fed. Rep. of Germany . |
| 3542391 | 6/1987 | Fed. Rep. of Germany . |
| 2155905 | 10/1985 | United Kingdom . |

OTHER PUBLICATIONS

Patents Abstract of Japan, Unexamined Application, vol. 8, No. 204, 9/18/84 Kokai-No. 59–87 642 (Matsushita Denki Sangyo K.K.).

Primary Examiner—A. J. Heinz
Attorney, Agent, or Firm—Ronald P. Kananen

[57] ABSTRACT

A recording and/or reproducing apparatus for a magnetic tape cassette has a back-tension arm pivotably mounted on a mechanical chassis of the apparatus and an actuator mechanism for releasing braking force applied on a pair of tape reel bases by a pair of braking arms while a magnetic tape is run at a high-speed speed. The actuator mechanism includes an axially sliding connector rod engaging with a slider through which said back-tension arm is actuated according to movement of the connector rod, whereby the back-tension arm may apply light friction to the take-up reel base in a reverse running mode in which the magnetic tape is fed from the take-up reel to the supply reel by rotation of a capstan and pinch roller at a relatively slow speed. This causes slack in the magnetic tape to prevent when the tape is started in the reverse running mode.

30 Claims, 9 Drawing Sheets

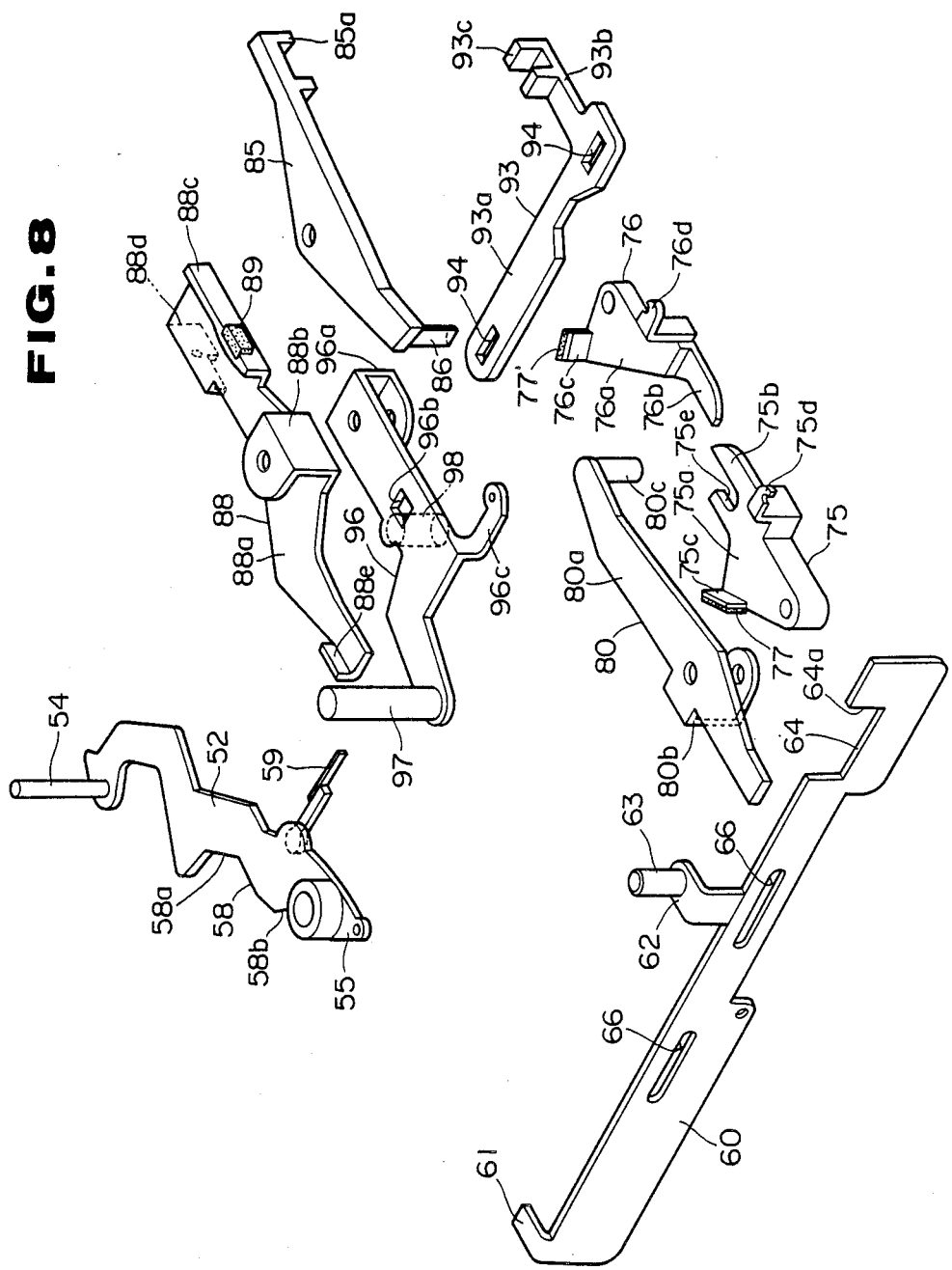

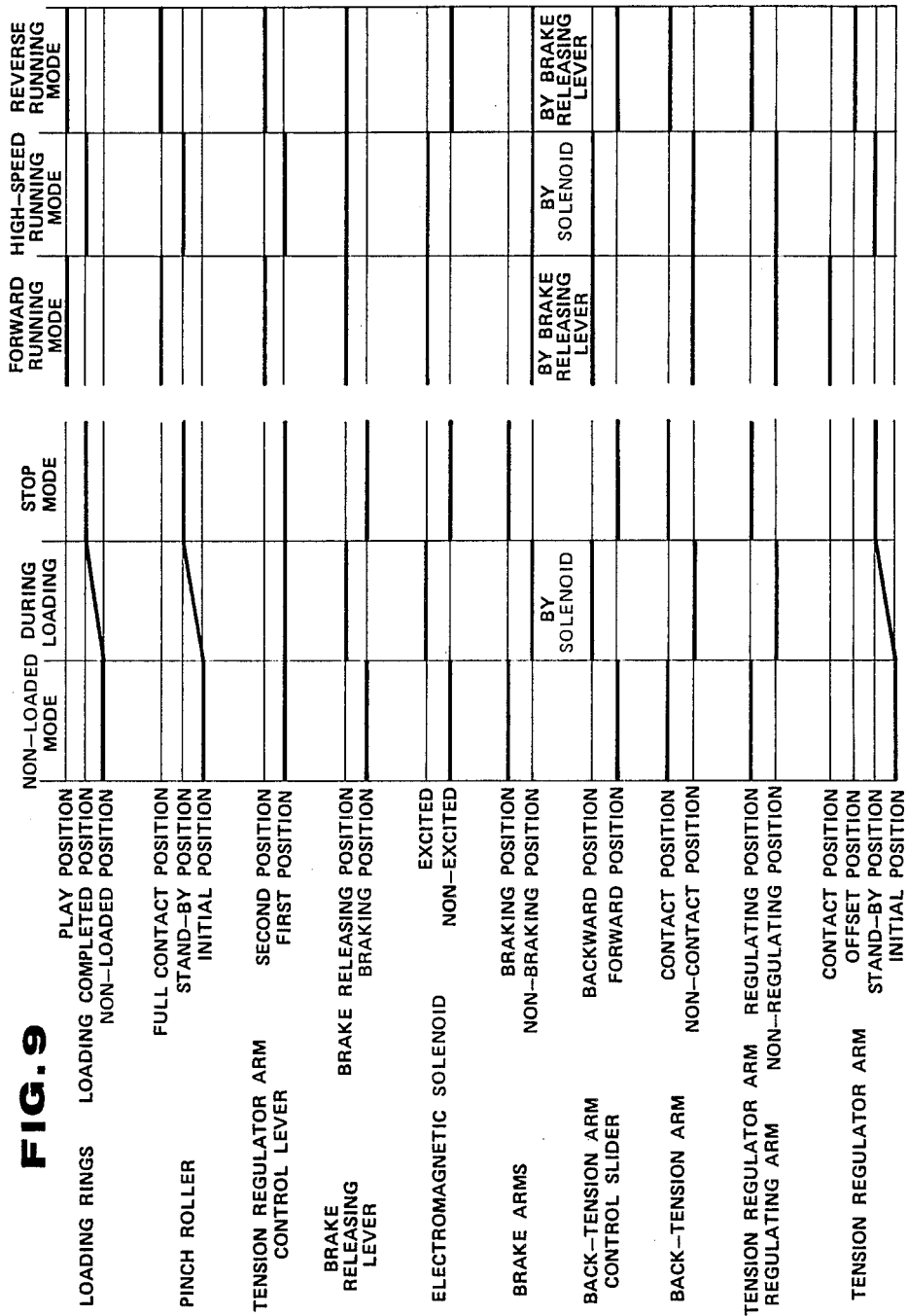

RECORDING AND/OR REPRODUCING APPARATUS WITH ROTARY HEAD FOR MAGNETIC TAPE CASSETTE

BACKGROUND OF THE INVENTION

The present invention relates in general to a recording and/or reproducing apparatus for a magnetic tape cassette specifically suited for video tape recorders (VTR), and digital audio tape recorders (DAT). Further particularly, the invention relates to the construction of the recording and/or reproducing apparatus including the magnetic rotary head, back tension mechanism and so forth.

Recently, various magnetic tape cassettes applicable to recording and/or reproducing apparatus with rotary heads have been proposed. One such typical magnetic tape cassette applicable to recording and/or reproducing apparatus is disclosed in the European Patent First Publication No. 01 60 822, published on Nov. 13, 1985, and the British Patent First Publication No. 2, 155, 905, published on Oct. 2, 1985. In the recording method of VTR's or DAT's, the magnetic tape is helically wound about the rotary head drum and the recording tracks are formed on the tape obliquely to the longitudinal direction thereof. Signal data is formed or read the magnetic rotary head out of the recording track. This recording method is referred to as "helical recording". This type of recording and/or reproducing apparatus includes a rotary head drum, supply and take-up reel bases on which supply and take-up reels are respectively engaged and a reel base driving means for rotating either of the reel bases in the required direction according to the selected operating mode, a tape loading mechanism winding some of the magnetic tape about the head drum after extracting it from the magnetic tape cassette, a reel base braking means for stopping rotational movement of the reel base in a stop mode in which the tape running is stopped, a brake releasing means for releasing the braking force caused by the braking means, a capstan rotating at a relatively slow constant speed, a pinch roller rotating with the capstan to feed the tape therebetween, and a back tension applying means, such as a tension regulator arm having a tension regulator pin, to apply back tension to the tape by applying pushing force to a surface of the tape in the tape running mode, and so forth.

When the recording and/or reproducing apparatus is in recording or reproducing operation, the tape is run at a constant speed by the rotational movement of the capstan and the pinch roller in a tape forward direction wherein the tape is wound from the supply reel to the take-up reel, and the running speed of the magnetic tape is controlled so as to be constant by the tension regulator pin so that fluctuation of the tape running speed is prevented. On the other hand, when the recording and/or reproducing apparatus is in the fast forward (F/F) mode or rewinding mode wherein the tape is run at a high-speed, the tension regulator pin is moved away from the side surface of the tape and the take-up reel base or the supply reel base rotates in the tape winding direction at a high speed. As described above, such rotary-head-type recording and/or reproducing apparatus is composed of many relatively complicated mechanisms.

When the apparatus is operated in a reverse mode in which the tape is wound from the take-up reel to the supply reel. It is necessary that back-tension be applied to the surface of the magnetic tape between the rotary head drum and the take-up reel for preventing slack in the tape. For example, in the case of the auto music sanning mode which will be hereinafter referred to as an "AMS", of a digital audio tape recorder (DAT), the tape is run at a higher speed than in the reproducing mode. In the AMS mode, the tape is stopped the moment an identification code data indicative of a beginning position of a desired tape segment is detected by the detecting means. This identification signal will be hereinafter referred to as an "ID code". Generally, the data is stored in a plurality of linear data regions which are so called tracks. This ID code data is written in the track formed in the vicinity of the edge of the magnetic tape. It is difficult to stop the tape at the exact desired position when the ID code is detected, because of the inertia of the tape driving means. It is particularly difficult to stop the tape running when the tape is running at a high speed. Therefore, normally in the AMS operation of the recording and/or reproducing apparatus, after detection of the ID code at a high speed, the tape direction is reversed and scanned again at a medium speed and when the ID code is detected again the tape is stopped. In this operation, a slight difference between the desired tape stop position and the actual tape stop position may still be caused. In which case, the tape direction is reversed again and the tape is run at a low speed, and after detection of ID code at the low speed, the tape is stopped at the desired tape stop position. After this, the recording/reproducing apparatus is operated in the reproducing mode. Thus, as will be appreciated from the above, when DAT having an AMS function is operated in the AMS mode, it is necessary that the running speed of the magnetic tape be changed from a high speed to a medium speed and further to a low speed, and the tape running direction is changed a number of times. In the above high-speed running mode, the tape is driven by the reel base. In the medium and low speed modes, the tape is driven by rotation of the pinch roller and the capstan. In this type of system, the tape section between the pinch roller and the capstan tends to become slack when the tape is started. Therefore, it is necessary to apply a tensioning force to the surface of the tape. While the tape is running in the forward direction, tension is applied by the tension regulator pin to the magnetic tape for preventing slack. When the tape is running in the reverse direction, it is necessary to apply back-tension to the take-up side reel base. This kind of recording and/or reproducing apparatus does not include another pinch roller and another capstan between the supply reel base and the rotary head drum in addition to the pinch roller and the capstan between the take-up reel base and the rotary head drum, or a second tension regulator between the take-up reel base and the head drum, thus the number of parts, the cost, and the complexity of the apparatus can be kept low.

An electromagnetic mechanism is provided for moving a brake shoe into or out of contact with the take-up reel base. The brake shoe is operated into contact with the take-up reel base while the tape is running in the reverse modes. On the other hand, in other modes, the brake shoe is held away from the take-up reel base. In the prior art two electromagnetic servo mechanisms are required. One operates a pair of brakes that serve to stop the tape reels and other operates a tensioning brake. Such electromagnetic servo mechanisms are expensive, and a special control circuits are required for controlling them, thereby increasing the cost of the product and electric power consumption and limiting the compactness of the apparatus.

SUMMARY OF THE INVENTION

It is, therefore, a primary object of the disclosed invention to provide a recording and/or reproducing apparatus in which a single servo mechanism provides the back tension function.

It is another and other specific object of the present invention to provide an operational mode switching mechanism of the apparatus in which the electromagnetic servo mechanism releases braking force on a pair of reel bases during tape loading or in a high-speed running mode of the apparatus, and wherein a loading mechanism releases the braking force on the pair of reel bases in a forward or reverse mode.

In order to accomplish the aforementioned and other objects, a recording and/or reproducing apparatus for a magnetic tape cassette according to the invention has a back-tension arm mounted pivotably on a mechanical chassis of the apparatus and an electromagnetic servo mechanism for releasing braking force exerted on the take-up reel base by a pair of braking arms. The back-tension arm engages with a first slider through which the back-tension arm can come into contact with a brake drum of the take-up reel base or disengage from it in accordance with the operational position of the electromagnetic servo mechanism.

Alternatively, in order to accomplish the aforementioned and other objects of the invention, a recording and/or reproducing apparatus for a magnetic tape cassette, according to the invention, is provided with an operational mode switching mechanism includes the loading mechanism for extracting some of the magnetic tape from the magnetic tape cassette and the electromagnetic mechanism for releasing braking force on the pair of reel bases. The loading mechanism is comprised of upper and lower loading rings rotatable in the opposite directions, a pushing arm attached to the upper loading ring carrying a pinch roller in a contact position so as to come into contact with a capstan, and a pin projecting upwardly from the upper surface of the lower loading ring so as to actuate a second slider in the forward or reverse running mode. The electromagnetic mechanism is comprised of an electromagnetic solenoid having a solenoid casing and a connector rod slidably enclosed in the casing. The connector rod engages with the first slider to vary the position of the back-tension arm and a pivotable lever to vary the position of the pair of brake arms. In this construction according to the invention, various operational modes of the recording and/or reproducing apparatus is formed by a cooperative movement of the loading mechanism and electromagnetic mechanism.

According to one aspect of the invention, a recording and/or reproducing apparatus for a magnetic cassette tape comprises a capstan rotatable about its axis clockwise and counterclockwise, a pinch roller rotatably cooperating with the capstan to feed a magnetic tape wound on a pair of tape reels housed in a cassette casing of the magnetic tape cassette, reel base means receiving the magnetic tape cassette to drivingly cooperate therewith, and the reel base means including a pair of reel bases engageable with the pair of tape reels, braking means associated with the pair of reel bases for applying braking force onto the pair of reel bases so as to restrict rotation thereof, first means engageable with a first link member to release the braking force during tape loading and in a first operational mode in which a magnetic tape is run at a predetermined first speed by either of the pair of reel bases driven selectively according to the tape running direction, second means releasing the braking force in second and third operational modes in which the magnetic tape is run at a predetermined second speed slower than the first speed by rotation of the capstan and pinch roller and the tape running directions of second and third operational modes are opposite from each other, and third means including a second link member engageable with the first means and the third means applying friction onto either one of the pair of reel bases to apply back-tension to the magnetic tape between the capstan and the one of reel bases in the second or third operational mode.

The first means includes an electromagnetic solenoid having a solenoid casing and an axially sliding connector rod projecting outwardly from the casing.

The apparatus further comprises a rotary head having magnetic heads rotatable with a rotary drum for the magnetic tape cassette and further comprises tape loading means extracting the magnetic tape from the magnetic tape cassette such that the magnetic tape comes into contact with the rotary drum. The loading means comprises a pair of loading rings and a pair of tape guide blocks which may enter into a recess of the magnetic tape cassette to draw out some of said magnetic tape during tape loading and can move in the vicinity of the rotary head to bring the magnetic tape into contact with the rotary head.

The second means is actuated by rotational movement of the loading ring from a first position in which the braking force is applied onto said reel bases to a second position in which the braking force is released, the second means comprising a second slider engaging with at least one of the loading ring and a pivotable lever engagable with the second slider and the braking means.

The loading means includes a pushing arm by which the pinch roller comes into contact with the capstan.

According to another aspect of the invention, a recording and/or reproducing apparatus including a rotary head having magnetic heads rotatable with a rotary drum for a magnetic tape cassette comprises a capstan rotatable about its axis clockwise and counterclockwise, a pinch roller rotatably cooperating with the capstan to feed a magnetic tape wound on a pair of tape reels housed in a cassette casing of the magnetic tape cassette, reel base means receiving the magnetic tape cassette to drivingly cooperate therewith, and the reel base means including a supply reel base and a take-up reel base engageable with the pair of tape reels, braking means associated with the pair of reel bases for applying braking force onto the reel bases so as to restrict rotation thereof in a stop mode of the recording and/or reproducing apparatus, first means releasing the braking force in a first operational mode in which a magnetic tape is run at a predetermined first speed by either the supply reel base or said take-up reel base driven selectively in accordance with the tape running direction, second means releasing the braking force in a second operational mode in which the magnetic tape is fed on the take-up reel by rotation of the capstan and pinch roller at a predetermined second speed slower than the first speed or in a third operational mode in which the magnetic tape is fed on the supply reel base by rotation of the capstan and pinch roller at the second speed, tension regulator means coming into contact with the magnetic tape and applying tension thereto in the second operational mode, third means applying friction to the take-up reel base in the third operational mode, fourth means controlling friction onto the take-up reel base in the third operational mode such that the third means is released from engagement with the take-up reel base and the tension regulator means comes into contact with the magnetic tape in a first operational position in which the first means is operated, and fifth means controlling operation of the third means comes into contact with the magnetic tape in a second operational position in which the first means is deactivated.

The first means includes an electromagnetic solenoid having a solenoid casing and an axially sliding connector rod projecting outwardly from the casing. The connector rod engages with a first link member formed with a lever pivotable according to movement thereof. The connector rod furthermore engages with a second link member formed with a first slider movable therewith.

The tension regulator means comprises a tension regulator arm pivotable about its pivot shaft and a tension regulator pin through which the tension regulator arm apply tension to the magnetic tape while the recording and/or reproducing apparatus is in the second operational mode.

The third means associated with a third link member engagable with the tension regulator arm to regulate the angular position thereof while the recording and/or reproducing apparatus is in the third operational mode, comprising a pivotable arm biased against the take-up reel base by a spring so as to apply light friction thereto.

The second means engages with the tension regulator arm to control the angular position thereof while the recording and/or reproducing apparatus is in the stop mode or the first operational mode.

According to the invention, the single electromagnetic solenoid and the loading means can cooperatively function so as to form various operational modes of the recording and/or reproducing apparatus. Further, according to the invention, third means including the back-tension arm can serve to exert resistance to rotation of the take-up reel and to regulate rotational movement of the tension regulator arm in the reverse running mode of the apparatus. Moreover, according to the invention, the electromagnetic solenoid can function so as to release braking force on the pair of reel bases and to release light friction on the take-up reel base while the recording and/or reproducing apparatus is in the high-speed running mode.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 8 is an exploded perspective view showing the essential parts of the recording and/or reproducing apparatus of the invention; and FIG. 9 is a timing chart of the recording and/or reproducing apparatus of the invention illustrating the relationship of the operating position of each essential parts relative to each operating mode.

DESCRIPTION OF THE PREFERRED EMBODIMENTS

Referring now to FIGS. 1 to 7, the preferred embodiment of a recording and/or reproducing apparatus 1, which is a digital audio tape recorder (DAT) with an auto music scanning (AMS) function, has a mechanical chassis 2.

Figure 1:
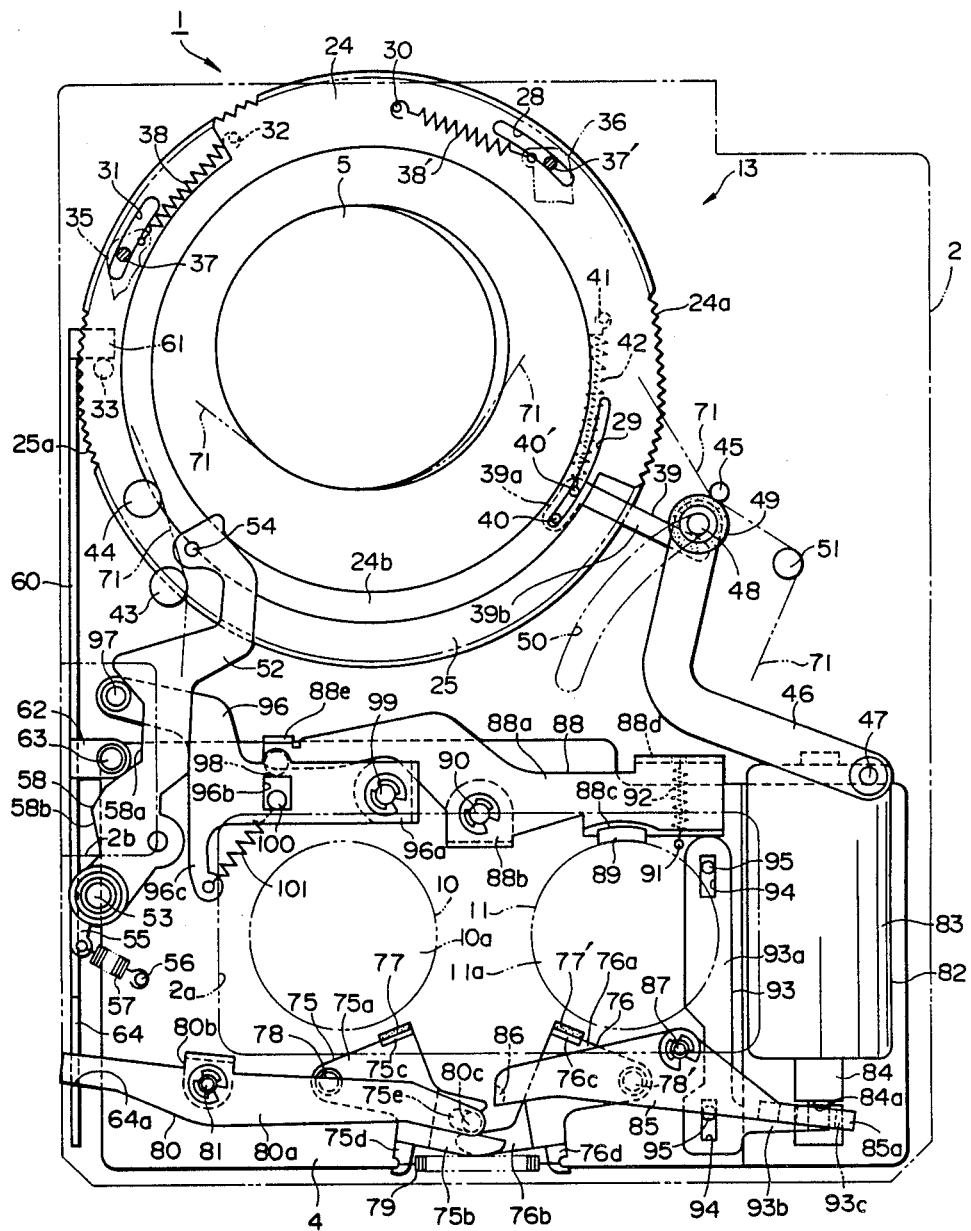
FIG. 1 is a plan view illustrating the essential parts of the recording and/or reproducing apparatus in the tape reverse running mode according to the invention.

It should be appreciated that, throughout the disclosure given herebelow, the word "front" represents the section illustrated in the lower half of FIG. 1, the word "rear" represents the section illustrated in the upper half of FIG. 1, and the words "right" and "left" represent the right-hand and left-hand sides in FIG. 1.

Figure 2:
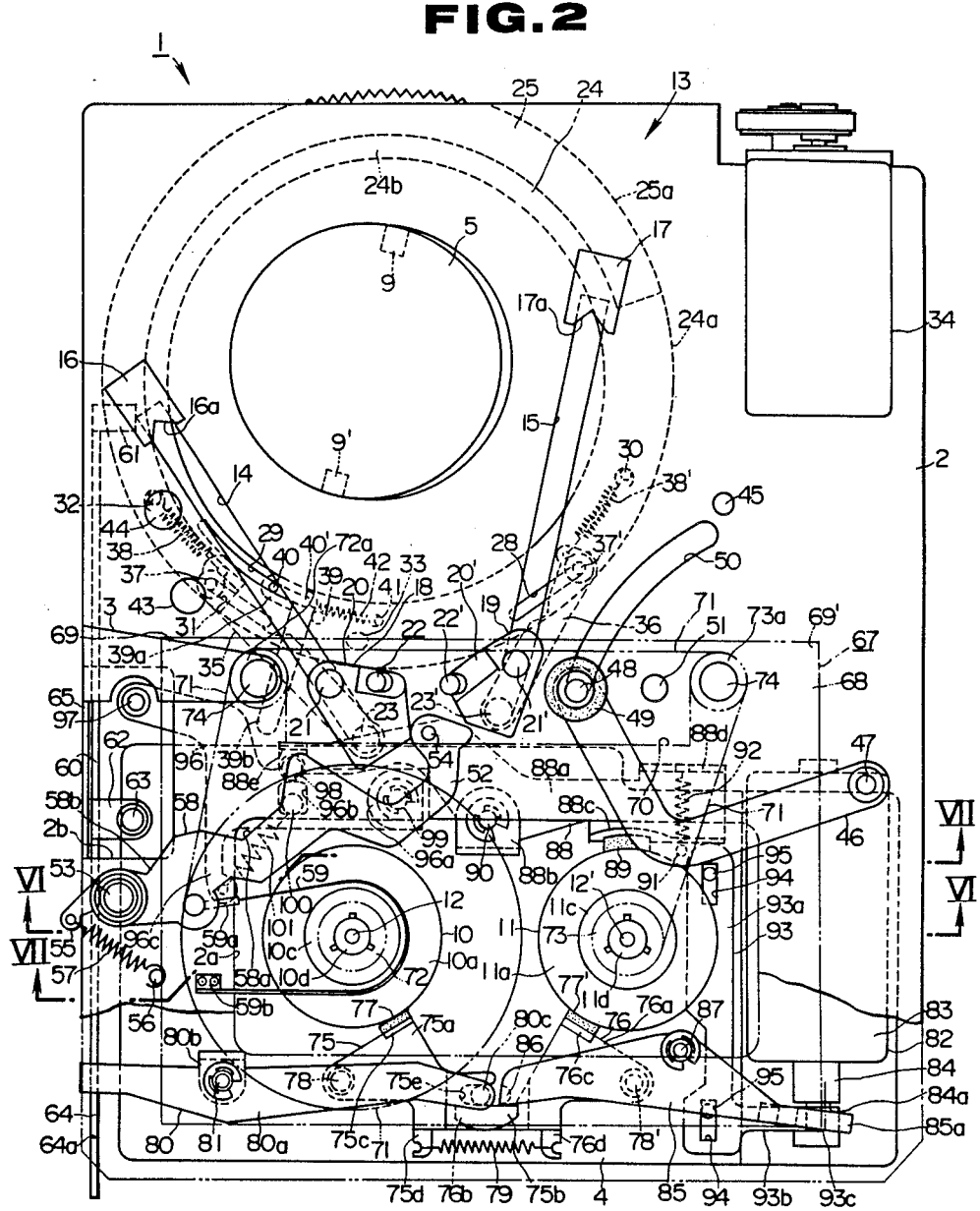
FIG. 2 is a plan view illustrating the recording and/or reproducing apparatus according to the invention in the non-loaded mode.
Figure 3:
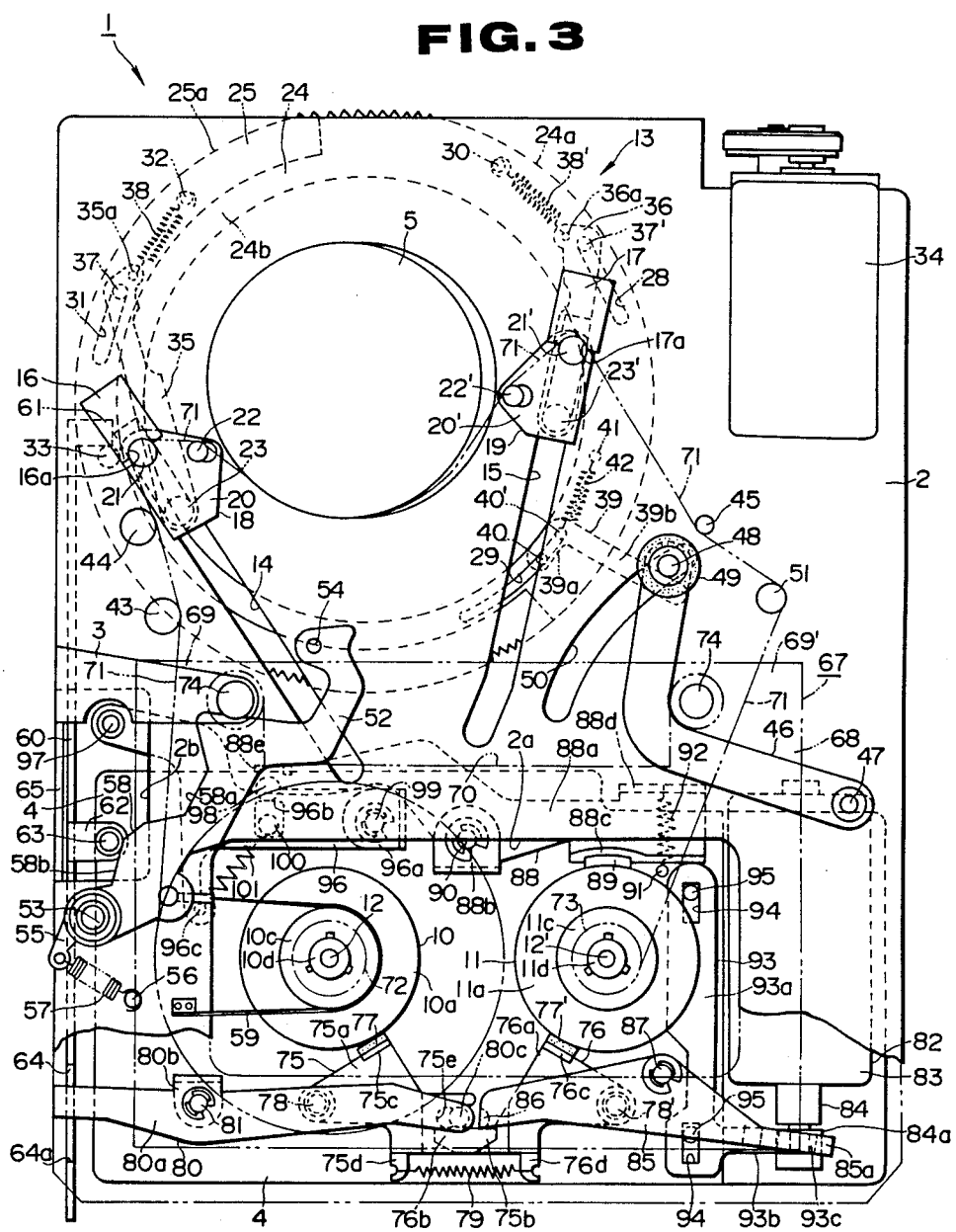
FIG. 3 is a plan view illustrating the recording and/or reproducing apparatus according to the invention in the stop mode.
Figure 6:
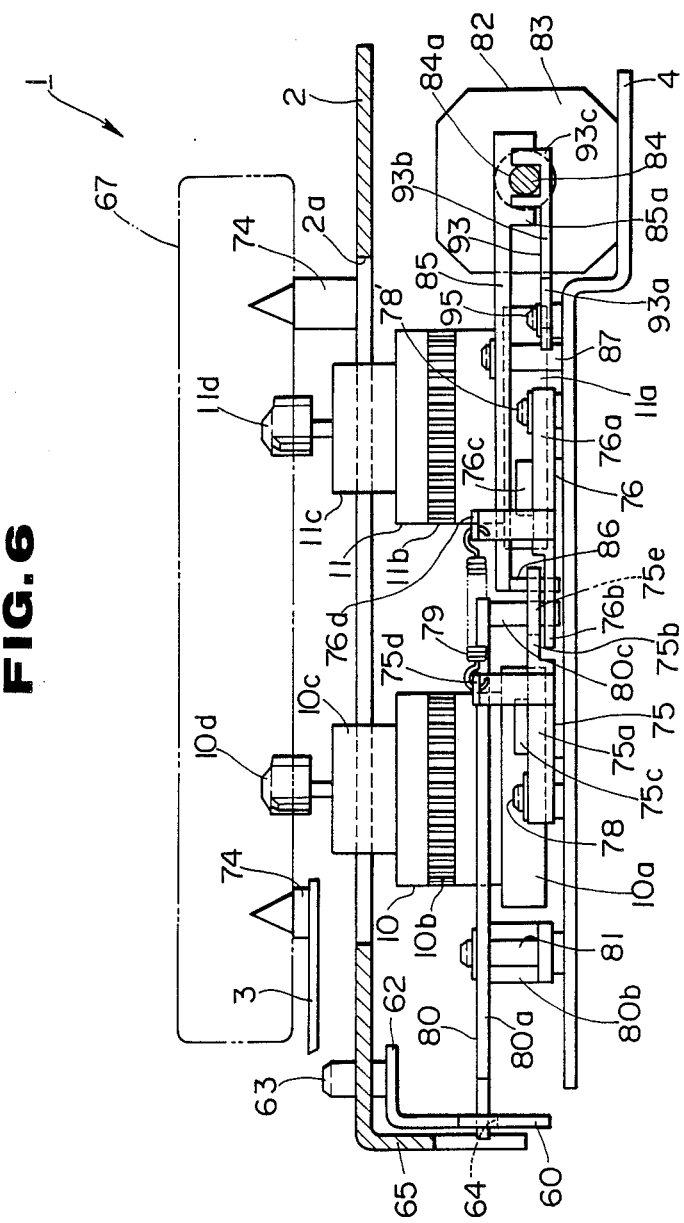
FIG. 6 is a cross sectional view along line VI—VI of FIG. 2 showing the essential parts of the recording and/or reproducing apparatus of the preferred embodiment of the invention.

The chassis 2 is substantially rectangular. The mechanical chassis 2 has a rectangular opening 2a near the front end of the lower half, which opening is elongated left-to-right in which reel bases 10 and 11 are accommodated. The mechanical chassis 2 includes also a rectangular cut-out 2b at the left side and near the longitudinal center thereof, and includes a support strip 3 which extends horizontally from the left-hand edge of the chassis 2 at about the longitudinal center as shown in FIGS. 2, 3, and 6. The support strip 3 is provided for supporting a cassette positioning pin 74. The reel bases 10 and 11 are centered in the opposite ends of the rectangular opening 2a. As best shown in FIG. 1, a sub-chassis 4 is securely mounted beneath the chassis 2 on a plurality of supporting posts (not shown). The supporting posts serve as spacers holding the sub-chassis 4 in a fixed positional relationship with the mechanical chassis 2. Therefore, the length of the supporting posts corresponds to the desired distance between the mechanical chassis 2 and the sub-chassis 4.

Figure 7:
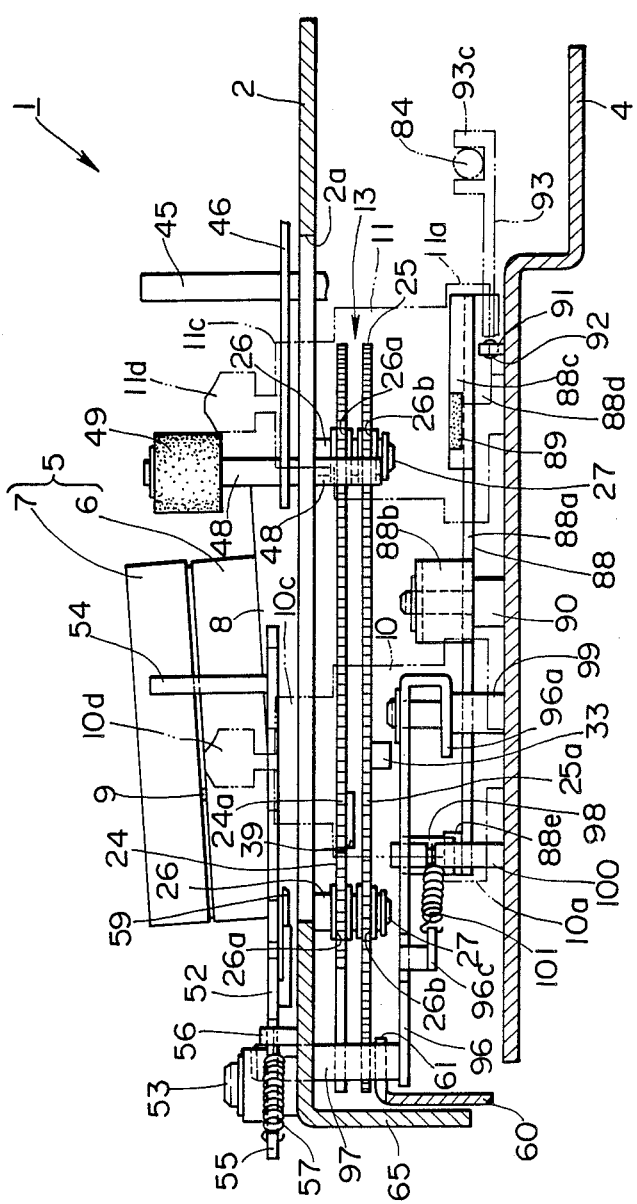
FIG. 7 is a cross sectional view along line VII—VII of FIG. 2 showing the essential parts of the recording and/or reproducing apparatus of the preferred embodiment of the invention.

A rotary head assembly 5 is mounted near the rear end of the chassis 2. As is apparent from FIGS. 1 to 5, the rotary head assembly 5 is slightly offset from the longitudinal axis of the chassis 2. As shown in FIG. 7, the rotary head assembly 5 is composed of a lower stationary drum 6 and an upper rotary drum 7. The lower stationary drum 6 is fixed on a drum base 8 secured on the upper surface of the chassis 2. The upper rotary drum 7 is rotatably supported above the lower stationary drum 6. As shown in FIGS. 2 and 7, two magnetic heads 9 and 9' for reading or writing signals recorded on a magnetic tape 71 are mounted on the lower edges of the upper rotary drum 7. The magnetic heads 9 and 9' rotate with the upper rotary drum 7. As is clearly shown in FIG. 7, the axis of the rotary head assembly 5 is inclined relative to the plane of the mechanical chassis 2. Therefore, the magnetic heads 9 and 9' track across the tape 71 at an angle to its longitudinal axis, this is referred to as "helical scanning". Although it is not shown in the drawings, the upper rotary drum 7 is rotated counterclockwise by a drive shaft which is drivingly associated with a rotary head drive mechanism, which is of a conventional well known construction, and therefore, has been neglected from the drawings for simplification of the drawings and disclosure. Although not shown in the drawings, the lower stationary drum 6 has a thin cut-out which serves as guiding the magnetic tape 71 as it runs across the rotary head assembly 5.

The reel bases 10 and 11 are separated from each other by a distance equal to the distance between the axes of the tape reels of a magnetic tape cassette or cartridge. The reel bases 10 and 11 are rotatably supported by reel base supports 12 and 12' as shown in FIGS. 2 and 3. As seen in FIG. 6, the reel bases 10 and 11 are essentially cylindrical and comprise brake drums 10a and 11a, driving gears 10b and 11b, reel receiving portions 10c and 11c, and reel shafts 120d and 11d. The driving gears 10b and 11b are associated with a known tape drive mechanism through an appropriate power train which selectively drives one of the reel bases 10 and 11 according to the selected operation mode of the recording and/or reproducing apparatus. The reel shafts 10d and 11d are axially aligned with the vertical center axes of the reel bases 10 and 11 and are designed to engage with the tape reels of the magnetic tape cassette or cartridge. The upper sections of the reel receiving portions 10c and 11c and the reel shafts 10d and 11d extend upward through the rectangular opening 2a and project above the mechanical chassis 2, as clearly shown in FIG. 6.

The tape drive mechanism and power train for selectively driving one of the reel bases 10 and 11 through the driving gears 10b and 11b are of a well known construction and needn't be discussed further, and in order to simplify the drawings and the disclosure, they are neglected therefrom. However, it should be appreciated that the present invention may be applicable to any type of the recording and/or reproducing apparatus including any type of tape driving mechanism and power train.

In the illustrated embodiment, the reel shaft 10d of the reel base 10 is designed to engage with a supply reel of the magnetic tape cassette, from which the tape 71 is unwound as the tape is fed in a forward direction. On the other hand, the reel shaft 11d of the reel base 11 is designed to engage with a take-up reel of the magnetic tape cassette, around which the tape 71 is wound as it is fed in the forward direction. Therefore, when the recording and/or reproducing apparatus is operating in a forward tape-feed mode, such as PLAY mode, fast-forward (F/F) mode, RECORD mode etc., the take-up reel base 11 is driven by the driving mechanism through the power train and the driving gear 11b. On the other hand, when the recording and/or reproducing apparatus is operating in a reverse tape-feed mode, such as a REWINDING mode, the supply reel base 10 is driven by the driving mechanism through the power train and the drive gear 10b. In FIGS. 2 and 3, the forward direction of the tape corresponds to clockwise rotation of the reels, and the reverse direction of the tape corresponds to counterclockwise rotation.

As shown in FIGS. 2 and 3, reference numeral 13 represents a magnetic tape loading mechanism, which comprises a pair of elongated guide holes 14 and 15, a pair of tape loading blocks 18 and 19 being movable along the respective guide holes 14 and 15, loading rings 24 and 25 moving the loading blocks 18 and 19 in a predetermined position, rotating means for rotating the loading rings 24 and 25, and a pinch roller pushing arm 39. The elongated guide holes 14 and 15 are formed on the mechanical chassis 2 for guiding movement of the loading blocks 18 and 19, respectively. The rear ends of the guide holes 14 and 15 are located on both sides of the rotary head assembly 5. The distance between the guide holes 14 and 15 is greatest at their rear ends and gradually decreases toward their front ends to define a generally V-shaped path for the loading blocks 18 and 19. The guide hole 14 is substantially straight throughout its length. The front end of guide hole 15 bends slightly toward the front end of the guide hole 14.

The front ends of the guide holes 14 and 15 lie near the rectangular opening 2a. The rear end of the guide hole 14 lies near the left side of the chassis 2 slightly forward of the center of the rotary head assembly 5. On the other hand, the rear end of the guide hole 15 lies to the right and slightly rearward of the center of the rotary head assembly 5. As will be apparent from FIGS. 2 and 3, the length of guide hole 14 is shorter than that of guide hole 15. The front ends of guide holes 14 and 15 are so located that the distance between the front end of guide hole 14 and the reel base 10 is shorter than that between the front end of the guide hole 15 and the reel base 11.

Loading post catchers 16 and 17 are provided at the rear ends of guide holes 14 and 15, respectively, for determining relative positions of the tape loading blocks 18 and 19 relative to the rotary head assembly 5. The loading post catchers 16 and 17 are firmly fixed on the upper surface of the mechanical chassis 2. The catchers 16 and 17 are rectangular in shape. The front ends of the catchers 16 and 17 are open. The upper surfaces of the catchers 16 and 17 have essentially V-shaped notches 16a and 17a at the front ends thereof for receiving loading posts 21 and 21', respectively. Therefore, the upper surfaces of the catchers 16 and 17 are directed substantially along the axes of the elongated guide holes 14 and 15.

As shown in FIGS. 2 and 3, the tape loading blocks 18 and 19 comprise relatively thick block bases 20 and 20', loading posts 21 and 21' vertically extending from points near the rear edges of the block bases 20 and 20', tilting posts 22 and 22' extending upward from facing inner ends of the bases 20 and 20'. Connecting shafts 23 and 23' extending downward from the bottoms of the block bases 20 and 20' slidably engage with the guide holes 14 and 15 and are connected to the loading rings 24 and 25 through connecting levers 35 and 36, respectively. In order to facilitate smooth movement of the loading blocks 24 and 25, the diameters of the connecting shafts 23 and 23' are slightly smaller than the width of the guide holes 14 and 15.

The annular loading rings 24 and 25 are rotatably supported beneath the mechanical chassis 2 by means of three support rollers 26. As shown in FIG. 7, the support rollers 26 are substantially circular and rotatably supported by roller supporting shafts 27 extending downward from the bottom surface of the mechanical chassis 2. The support rollers 26 have four flange portions radially extending from the outer periphery thereof. Upper annular grooves 26a are formed between the two upper flange portions and lower annular grooves are formed between the two lower flange portions. The three support rollers 26 are arranged around the drum base 8. The upper annular grooves 26a and lower annular grooves 26b of the respective rollers 26 are at equal levels and are parallel to the plane of the chassis 2.

The inner periphery of the loading ring 24 engages with the upper annular grooves 26a and the inner periphery of the loading ring 25 engages with the lower annular grooves 26b. The loading rings 24 and 25 are thus coaxially supported beneath the mechanical chassis 2 with a predetermined space herebetween. The engagement between the loading rings 24, 25 and the annular grooves 26a, 26b allows rotation of the loading rings 24 and 25 about three support rollers 26.

Figure 4:
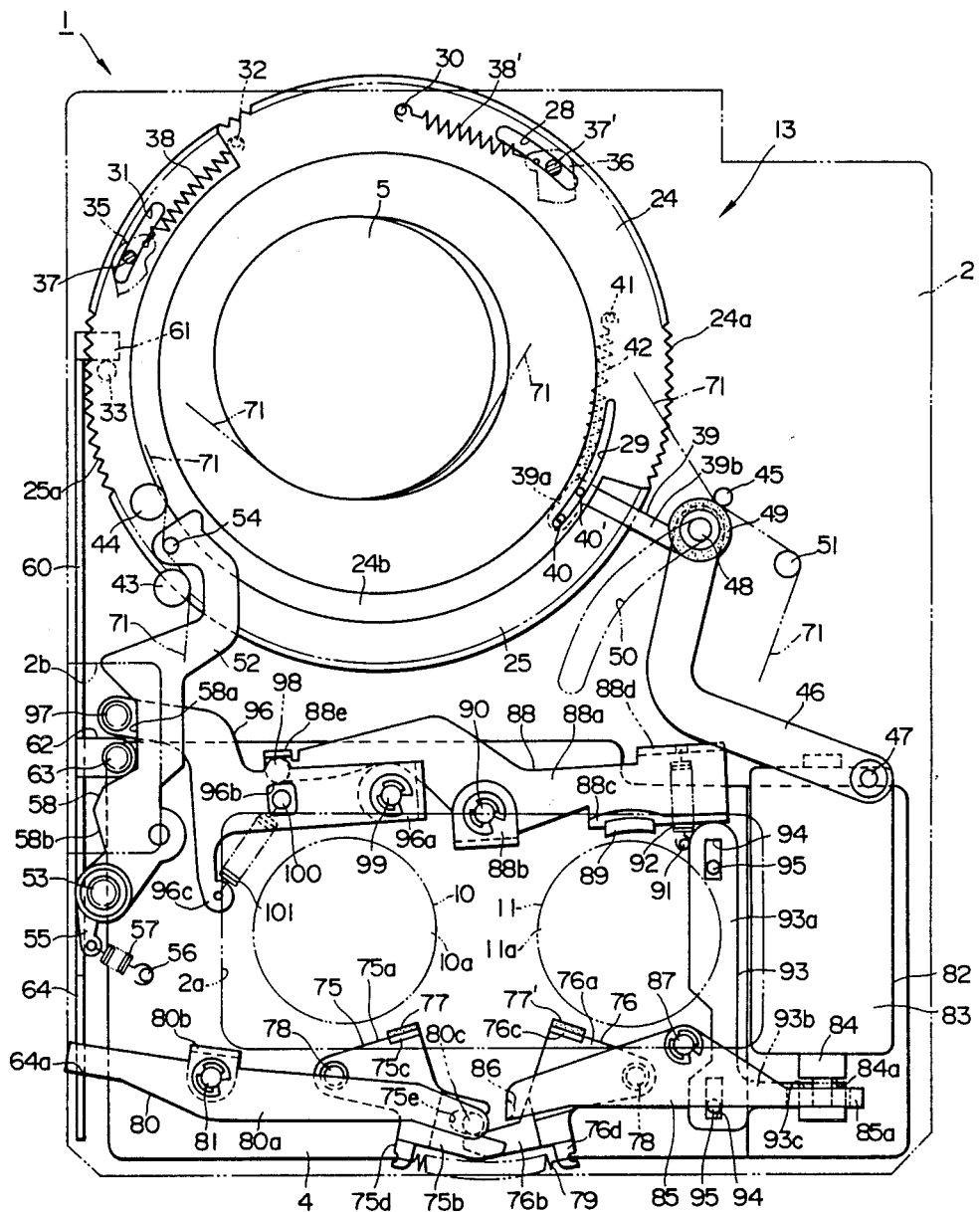
FIG. 4 is a plan view illustrating the essential parts of the, recording and/or reproducing apparatus according to the invention in the forward mode.
Figure 5:
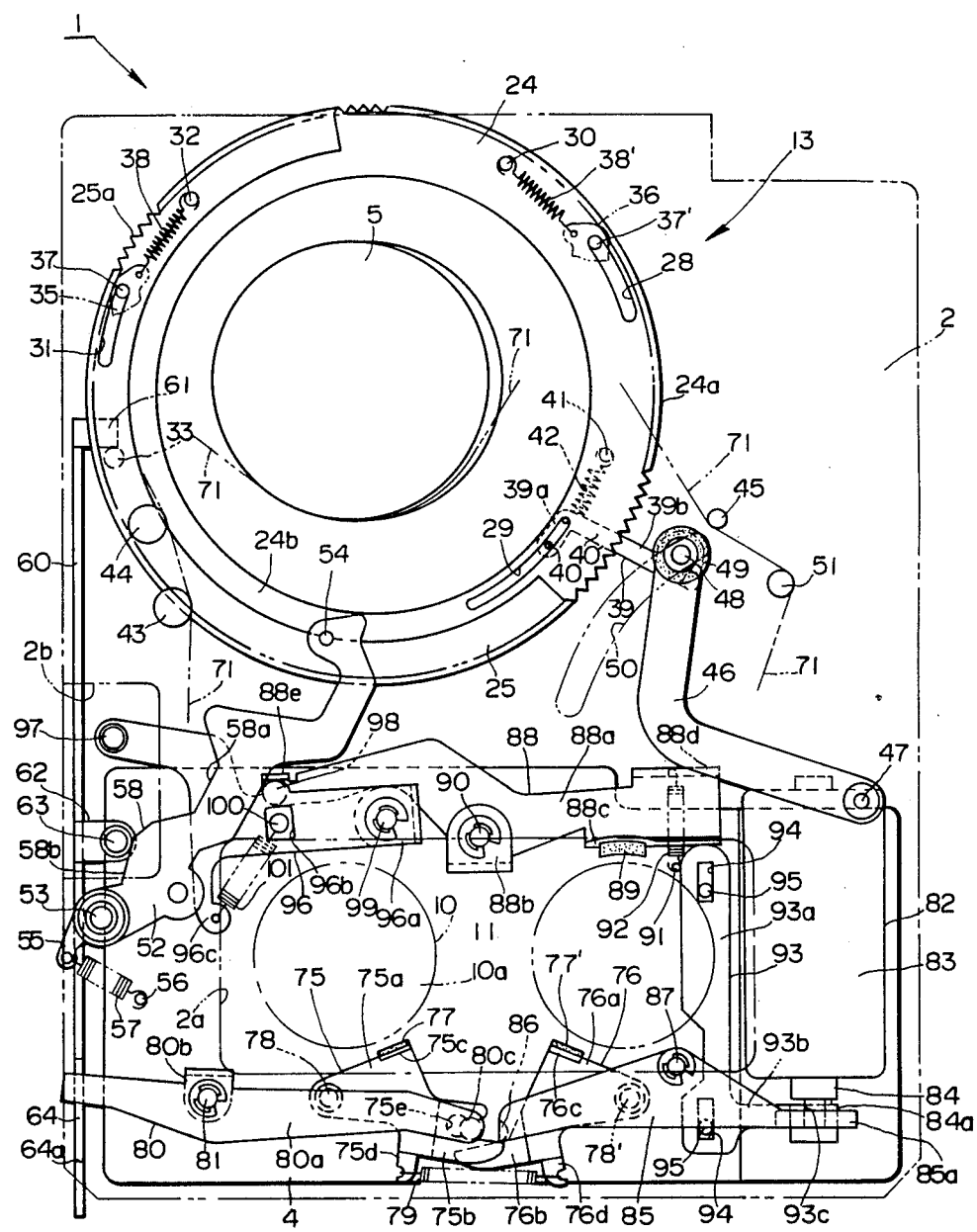
FIG. 5 is a plan view illustrating the essential parts of the recording and/or reproducing apparatus according to the invention in the high-speed running mode.

As best shown in FIGS. 1, 4, and 5, the upper loading ring 24 has wider and narrower radius sections. The wider radius section covers substantially half of the circumference of the upper loading ring 24 and has an outer gear teeth 24a. The narrower radius section 24b is toothless. The upper loading ring 24 has an elongated arcuate hole 28 at the section thereof near the outer circumference. The upper loading ring 24 has also an elongated arcuate hole 29 at the end of the wider radius section in the clockwise direction. A spring hook 30 is provided on the upper surface of the wider radius section of the upper loading ring 24 in the counterclockwise direction from the arcuate elongated hole 28.

On the other hand, the lower loading ring 25 has outer gear teeth 25a all along the outer periphery thereof. The lower loading ring 25 has also an elongated arcuate hole 31 near its outer periphery. A spring hook 32 is provided on the upper surface of the lower loading ring 25 in the clockwise direction from the elongated arcuate hole 31. The lower loading ring is further provided with a pushing pin 33 downward projecting from its bottom surface. The pushing pin 33 is located in the counterclockwise direction of the arcuate elongated hole 31 and associated with a tension regulator arm control lever 60 to be operated thereby into various mode positions depending upon the operation mode of the recording and/or reproducing apparatus.

Reference numeral 34 shows a loading motor rotating the upper and lower loading rings 24 and 25. The loading motor is mounted on the right-rear corner of the chassis 2 as shown in FIGS. 2 and 3. Although it is not clearly shown in the drawings, it should be appreciated that a loading ring driving gear engaging with the outer gear teeth 24a and 25a and a reduction gear mechanism for transmitting torque from the loading motor 34 is provided on the lower surface of the mechanical chassis 2. Therefore, the upper and lower loading rings 24 and 25 can be rotated in opposite directions each other by means of the loading ring driving gear and the reduction gear mechanism. The loading motor 34 can be driven forward during tape loading, and can be driven in reverse during tape unloading. When the loading motor 34 is driven forward, the upper loading ring 24 is rotated counterclockwise and the lower loading ring 25 is rotated clockwise. This rotational sense of the upper and lower loading rings 24 and 25 will be hereinafter referred to as a "loading direction". On the other hand, when the loading motor 34 is driven in reverse, the upper loading ring 24 is rotated clockwise and the lower loading ring 25 is rotated counterclockwise. This rotational sense of the upper and lower loading rings 24 and 25 will be hereinafter referred to as an "unloading direction".

The connecting levers 35 and 36 are respectively interposed between the loading rings 24 and 25 and the loading blocks 18 and 19 in order to connect the lower loading ring 25 to the loading block 18 and to connect the upper loading ring 24 to the loading block 19. The connecting levers 35 and 36 are in the shape of elongated strips with transverse extensions at their rear ends. The transverse extentions have circular holes 35a and 36a to which tension springs 38 and 38' are attached. The other ends of the tension springs 38 and 38' are attached to the spring hook 32 of the lower loading ring 25 and the spring hook 30 of the upper loading ring 24, and apply tension to the connecting levers 35 and 36, respectively. The connecting lever 35 has a pin 37 projecting downward from the lower surface of its transverse extension and slidably engaging with the arcuate elongated hole 31 of the lower loading ring 25. On the other hand, the connecting lever 36 has a pin 37' projecting downward from the lower surface of its transverse extension and slidably engaging with the elongated arcuate hole 28 of the upper loading ring 24. In this construction, the left-hand loading block 18 and the right-hand loading block 19 can respectively move to the rear ends of the elongated guide holes 14 and 15 in synchronization with rotational movements of the loading rings 25 and 24 in the tape loading direction, and move to the front ends of the elongated guide holes 14 and 15 in synchronization with rotational movements of the loading rings 25 and 24 toward the tape unloading direction. The connecting levers 35 and 36 are pivotably supported by means of the elongated holes 31 and 28 through their projecting pins 37 and 37' and normally biased to rear ends of the elongated holes 31 and 28 by means of the tension springs 38 and 38'. Therefore, the connecting lever 35 moves in accordance with rotational movement of the lower loading ring 24 along with the tape loading block 18 until the biasing force prevents the connecting lever 35 from following rotation of the lower loading ring 25. Similarly, the connecting lever 36 moves in accordance with rotational movement of the upper loading ring 24 along with the tape loading block 19 until the biasing force prevents the connecting lever 36 from following rotation of the upper loading ring 24.

It should be noted that FIG. 3 shows a tape loading condition in which the tape loading blocks 18 and 19 are respectively positioned at the rear ends of the elongated guide holes 14 and 15, and FIG. 2 shows a tape unloading condition in which the tape loading blocks 18 and 19 are respectively positioned at the front ends of the elongated guide holes 14 and 15. The position shown in FIG. 3 will be hereinafter referred to as the "loading-completed position". Conversely, the position shown in FIG. 2 will be hereinafter referred to as the "non-loaded position".

As shown in FIGS. 1 to 5 and 7, reference numeral 39 denotes an L-shaped pinch roller pushing arm supported by means of the upper loading ring 24. The pushing arm 39 is located near the lower surface of the upper loading ring 24, as shown in FIG. 7. The L-shaped pushing arm 39 is formed with a short arm 39a and a long arm 39b and has two pins 40 and 40' which are separated from each other and project upward from the upper surface of the short arm 39a. The two projecting pins 40 and 40' slidingly engage with the arcuate elongated hole 29 of the upper loading ring 24. Reference numeral 41 denotes a spring hook extending downward from the lower surface of the upper loading ring 24, located in the counterclockwise direction from the elongated arcuate hole 29. A tension spring 42 is connected between the spring hook 41 and the projection pin 40'. Thus, the pinch roller pushing arm 39 is supported by the upper loading ring 24 in such a manner that the pushing arm 39 can move relative to the upper loading ring 24 within the elongated hole 29. The pin 40' of the pinch roller pushing arm 39 is normally biased toward the end of the elongated hole 29 near the spring hook 41 by tension of the spring 42. This allows the pushing arm 39 to rotate with the upper loading ring 24 until the biasing of the spring 42 is applied through the pushing arm 39 to the base of pinch roller shaft for holding pinch roller 49 in engagement with capstan 45. In the non-loaded position shown in FIG. 2, the pinch roller pushing arm 39 is positioned near the front end of the rotary head assembly 5.

In FIGS. 1 to 5, reference numerals 43 and 44 denote stationary guide posts, fixed on the upper surface of the chassis 2. The tape guide post 43 is located about halfway between the support strip 3 and the elongated guide hole 14. The tape guide post 44 is located approximately midway between the guide post 43 and the loading post catcher 16.

Capstan 45 is provided near the right side of the loading rings. As is well known, the lower end of the capstan 45 is connected to a flywheel (not shown) beneath the chassis 2, and the upper end of the capstan 45 projects through a circular opening in the chassis 2. The capstan 45 can rotate at a predetermined constant speed while the record and/or reproducing apparatus is operating in the PLAY mode or RECORD mode. This constant speed will be hereinafter referred to as the "basic rotational speed". The capstan 45 can rotate at various speeds depending upon the operation mode of the recording and/or reproducing apparatus.

A substantially L-shaped pinch roller arm 46 is pivotably connected to the mechanical chassis 2 near its right-hand end by means of a pivot shaft 47. The pivot shaft 47 is located in front and to the right of cassette positioning pin 74. Pinch roller shaft 48 extends upward and downward from the upper and lower surfaces of the pinch roller arm 46 at the free end of the latter. A pinch roller 49 is rotatably supported on the upper section of the roller shaft 48. The section of the roller shaft 48 extending downward from the lower surface of the roller arm 46 moves within an elongated arcuate hole 50 in the mechanical chassis 2. The arc of the elongated arcuate hole 50 is centered in the axis of the pivot shaft 47 of the pinch roller arm 46. The lower section of the roller shaft 48 can be actuated by the pushing arm 39, for holding the outer periphery of the pinch roller 49 to be in contact with the outer periphery of the capstan 45.

A movable tape guide post 51 lies near the pinch roller 49. The movable guide post 51 projects upward from the free end of a movable post support arm (not shown) which is provided beneath the chassis 2. The movable post 51 moves along an elongated arcuate hole (not shown) similar to the elongated hole 50. The pinch roller arm 46 engages with the movable post support arm so as to move the guide post 51 essentially in synchronization with movement of the pinch roller arm 46.

As shown in FIG. 2, the movable guide post 51 and the pinch roller arm 46 are normally biased in the counterclockwise direction by the bias force applying means. In order to simplify the drawings, the arm shaft, the movable post support arm, and the bias force applying means are not shown. While the recording and/or reproducing apparatus is in the non-loaded mode, the pinch roller 49 and the movable guide post 51 are positioned in the non-loaded position as shown in FIG. 2. As clearly shown in FIG. 2, the pinch roller 49 and the movable guide post 51 are placed near the right-hand tape loading block 19. When the upper loading ring 24 rotates counterclockwise, that is, in the tape loading direction, the lower section of the pinch roller shaft 48 is pushed by the pushing arm 39, with the result that the pinch roller 49 is gradually rotated clockwise. The movable guide post 51 is also rotated clockwise depending upon movement of the pinch roller arm 46.

A tension regulator arm 52 is pivotably supported on the upper surface of the chassis 2 by means of a pivot shaft 53 projecting upward from the upper surface of the chassis 2. The pivot shaft 53 is provided near the left edge of the mechanical chassis 2. A tension regulator pin 54 extends upwardly from the rear end of the tension regulator arm 52. The tension regulator pin 54 is provided for applying back-tension to the magnetic tape 71. The tension regulator arm 52 has a frontwardly extending strip 55 which has a circular opening to which one end of a tension spring 57 is attached. The other end of the tension spring 57 is supported on a spring hook 56 extending upward from the upper surface of the chassis 2. The spring hook is located about midway between the left-hand edge of the chassis 2 and the left edge of the rectangular opening 2a. Therefore, the tension regulator arm 52 is biased in the counterclockwise direction by the tension spring 57. As clearly seen in FIG. 2, in the non-loaded mode, the tape loading block 18 prevents the tension regulator arm 52 from rotating counterclockwise, with the result that the rear end of the tension regulator arm 52 is positioned between the two tape loading blocks 18 and 19. This position of the tension regulator arm 52 will be hereinafter referred to as an "initial position".

A cam portion 58 is formed on the left-hand edge of the tension regulator arm 52. The cam portion 58 includes a trapezoidal cut-out 58a and a cam surface 58b formed near the pivot shaft 53 of the tension regulator arm 52. The trapezoidal cut-out 58a and the cam surface 58b, cooperate with a tension regulator arm control pin 63 of the tension regulator arm control lever 60 to control the angular position of the tension regulator arm 52, while the recording and/or reproducing apparatus is operating in the loading mode, thereby controlling the position of the tension regulator pin 54 relative to a magnetic tape path defined by the stationary guide posts 43 and 44. In the non-loaded mode as shown in FIG. 2, the trapezoidal cut-out 58a and the cam surface 58b are separated from the tension regulator arm control pin 63. As seen in FIG. 3, the tension regulator arm 52 becomes free to pivot during the loading mode of the recording and/or reproducing apparatus. As a result, the tension regulator arm 52 and the tension regulator pin 54 rotates counterclockwise due to the tension of the tension spring 57. This oscillation of he tension regulator arm 52 brings the trapezoidal cut-out 58a or the cam surface 58b into contact with the tension regulator arm control pin 63 depending upon the sliding position of the tension regulator arm control lever 60.

A tension regulator band 59 is wrapped around the reel receiving portion 10c. One end of the tension regulator band 59 is connected to a connector member 59a pivotably connected to the tension regulator arm 52. The other end of the tension regulator band 59 is connected to a tension adjusting member 59b secured on the upper surface of the chassis 2. The setting position of the tension adjusting member 59b is adjustable so as to adjust tension of the magnetic tape 71. In this construction, the tension regulator arm 52 applies back-tensioning force to the magnetic tape 71 due to its pivotal movement to the counterclockwise or clockwise direction. The position of the tension regulator arm varys according to changes of tension of the magnetic tape 71, thereby varying the braking force the tension regulator band 59 exerts on the supply reel base 10. As a result, the tension of the magnetic tape 71 can be kept constant.

A tension regulator arm control lever 60 is provided beneath the left-hand edge of the chassis 2. The tension regulator arm control slider lever 60 is made of a thin elongated plate, which will be hereinafter referred to as the "slider". The slider 60 is formed with an essentially horizontal strip 61 extending rightwardly from its rear end, and an essentially horizontal pin support tab 62 extending rightwardly from its approximate center. The tension regulator arm control pin 63 projects upward from the upper surface of the pin support tab 62. The slider 60 has also a rectangular notch 64 near its front end. The front edge 64a of the rectangular notch 64 serves to push a brake releasing lever 80 as shown in FIG. 8.

The tension regulator arm control lever 60 is located adjacently to the right side of the side wall 65 extending downward from the left-hand edge of the chassis 2 as shown in FIG. 6. The horizontal strip 61 is arranged adjacently to the bottom surface of the lower loading ring 25 as shown in FIG. 7.

As seen in FIG. 8, the slider 60 has two elongated holes 66.

Although it is not shown in the drawings, a support pin projects rightwardly from the left side wall 65 of the chassis 2, and a tension spring is anchored between the side wall 65 and the slider 60. The support pin slidably engages with the elongated holes 66, thereby supporting the slider 60. The slider 60 is normally biased frontward by tension of the tension spring. In this way, the slider 60 can slide rearward or forward within a predetermined range depending upon the length of the elongated hole 66. The slider 60 is held in the position shown in FIGS. 2, 3, and 5, until the horizontal strip 61 is pushed by the pushing pin 33 projecting downward from the bottom surface of the lower loading ring 25. This position of the slider 60 will be hereinafter referred to as the "first position".

The tension regulator arm control pin 63 slides frontward or downward within the range defined by the cut-out 2b of the chassis 2. The tension regulator arm control pin 63 extends upward from the cut-out 2b in order to mate with the cam portion 58 of the tension regulator arm 52.

As seen in FIGS. 2, 3, and 6, the tape cassette 67 includes a relatively thin box-shaped cassette casing 68. The tape cassette 67 has a left-hand opening 69 and a right-hand opening 69' at its rear side as shown in FIG. 2. The magnetic tape 71 is drawn out through the openings 69 and 69' for loading. A recess 70 opposite the rotary head assembly 2 is formed between the left-hand and right-hand openings 69 and 69'. The recess 70 opens at the side opposing the head assembly 2 and has a downward facing opening through which the loading posts 21, 21' and the tilting posts 22, 22' of the loading blocks 18 and 19 can enter into the recess 70 to draw out some of the magnetic tape 71 when the system moves from the non-loaded mode position to the loading mode position.

Although not clearly shown in the drawings, the cut-outs in the side wall defining the recess 70 may be covered by a pivotable lid and the downward facing opening can be covered by a sliding closure. The pivotal lid and the sliding closure are actuated to expose respectively the cut-outs and the downward opening when the magnetic tape cassette 67 is inserted into a cassette holder (not shown) of the recording and/or reproducing apparatus 1 and moved to the set position.

A supply reel 72 and a take-up reel 73 are rotatably received in the tape casing 68. The ends of the magnetic tape 71 are securely fixed to drum portions of the supply reel 72 and the take-up reel 73, respectively. The magnetic tape 71 is wound around the drum portions of reels 72 and 73.

In the set position of the tape cassette 67, the magnetic tape 71 runs through a tape path as shown in the thick two dotted line in FIG. 2. Reference numerals 72a and 73a denote guide posts provided in the cassette casing 68. The magnetic tape 71 passes through the left-hand opening 69 and crosses the rear edge of the recess 70 via the guide posts 72a and 73a. The magnetic tape 71 enters the tape cassette 67 through the right-hand opening 69 and is wound around the drum portion of the take-up reel 73.

When the tape cassette 67 is inserted into the cassette holder of the recording and/or reproducing apparatus and positioned in the set position, the tape cassette 67 rests on the chassis 2 as seen in FIG. 2. Cassette positioning holes bored in the center of the guide posts 72a and 73a of the tape cassette 67 engage with the cassette positioning pins 74, thereby aligning the tape cassette 67. Similarly, each of reels 72 and 73 engages with the corresponding reel shafts 10d and 11d. This allows the supply and take-up reels 72 and 73 to be driven with the respective supply reel and take-up reel bases 10 and 11.

The aforementioned insertion of the tape cassette 67 to the recording and/or reproducing apparatus is performed before tape loading, that is, in the non-loaded mode.

While the recording and/or reproducing apparatus is still in the unloading mode, the loading posts 21, 21', the tilting posts 22, 22', the pinch roller 49, the movable guide post 51, and the tension regulator pin 54 are all positioned within the recess 70 and rest against the back-side of the magnetic tape 71.

Under this condition, the loading motor 34 rotates forward in response to a loading command and thereby rotates the upper loading ring 24 counterclockwise and rotates the lower loading ring 25 clockwise. Therefore, the loading blocks 18 and 19 move along the elongated guide holes 14 and 15 along with the respective connecting levers 35 and 36 through which the lower and upper loading rings 25 and 24 engage with the loading blocks 18 and 19. The tension regulator arm 52 rotates counterclockwise due to removal of block by the left-hand loading block 18.

In accordance with rotational movement of the upper loading ring 24, the long arm 39b of the pinch roller punching pin 39 comes into contact with the circumference of the pinch roller shaft 48 and pushes the pinch roller shaft 48. In this way, the pinch roller 49 rotates clockwise about its pivot shaft 47. Accordingly, the movable guide post 51 also rotates clockwise to guide the magnetic tape 71.

When the upper and lower loading rings 24 and 25 attain the loading-completed position as shown in FIG. 3, the lower sections of the loading posts 21 and 21' abut against the V-shaped notches 16a and 17a formed at the front ends of the catchers 16 and 17, thereby preventing the loading posts 21 and 21' from moving further to the rear. The movable post support arm of the movable guide post 51 abuts against its stopper (not shown), thereby keeping the movable guide post 51 positioned at the front right of the capstan 45. The pinch roller 49 is positioned at a slight distance from the capstan 45 and opposes the latter as shown in FIG. 3. This position of the pinch roller 49 will be hereinafter referred to as the "stand-by position". The cam surface 58b of the tension regulator arm 58 mates with the tension regulator arm control pin 63 of the slider 60 placed in the first position according to counterclockwise rotation of the tension regulator arm 52, thereby preventing rotational movement of the tension regulator arm 52. This position of the tension regulator arm 52 will be hereinafter referred to as the "stand-by position".

In this way, some of the magnetic tape 71 is drawn out of the tape cassette casing 68 by means of the loading posts 21, 21', the tilting posts 22, 22', the movable guide post 51 in accordance with movements of the loading blocks 18, 19, the pinch roller 49, and the movable guide post 51, as a result, some of the magnetic tape 71 comes into contact with the upper rotary drum 7 of the rotary head assembly 5 at a predetermined contact angle. Thus, the tape loading is completed.

When the recording and/or reproducing apparatus 1 is operating in the loading mode, an electromagnetic solenoid 82 is excited, thereby releasing braking force to the reel bases 10 and 11. Therefore, the reel bases 10 and 11 become free and the magnetic tape 71 is withdrawn from the supply and take-up reels 72 and 73, during the loading mode. This condition, as shown in FIG. 3 will be hereinafter referred to as the "loading stop mode". In the loading stop mode, the magnetic tape 71 passes through the tape path shown in FIG. 3. The magnetic tape 71 is withdrawn from the supply reel 71 and drawn out of the left-hand opening 69 of the cassette casing 68 and passes across stationary guide posts 43 and 44, left-hand loading post 21 and tilting post 22 and comes into contact with the upper rotary drum 7 at the predetermined contact angle. After this, the magnetic tape 71 passes across right-hand loading post 21', tilting post 22', capstan 45, and movable guide post 51 and enters into the cassette casing 68 through the right-hand opening 69' and is wound onto the take-up reel 73.

As seen in FIG. 3, the tension regulator pin 54 of the tension regulator arm 52 is out of contact with the magnetic tape 71 in the stop mode.

Brake arms 75 and 76 are provided on the sub-chassis 4 and pivotably supported by pivot shafts 78 and 78' which project upward from the upper surface of the sub-chassis 4 just in front of the respective reel bases 10 and 11. As best shown in FIGS. 2 and 3, the brake arm 75 for the supply reel is located near the front end of the brake drum 10a of the supply reel base 10, and the brake arm 76 for the take-up reel is located near the front end of the brake drum 11a of the take-up reel base 11.

As shown in FIG. 8, the brake arm 75 is formed with a substantially triangular portion 75a, an extension strip 75b, a shoe base 75c, a spring hook 75d, and an U-shaped notch 75e. On the other hand, the brake arm 76 is formed with a substantially triangular portion 76a, an extension strip 76b, a shoe base 76c, and a spring hook 76d. Brake shoes 77 and 77' are secured on the shoe bases 75c and 76c, respectively, in such a manner that the brake shoes 77 and 77' oppose the respective outer peripheries of the brake drums 10a and 11a. The triangular portions 75a and 76a are arranged at the same level relative to the plane of the sub-chassis 4. The extention strip 75b is slightly higher than the extention strip 76b. The lower surface of the extention strip 75b opposes the upper surface of the extention strip 76b, that is, the extention strips 75b and 76b overlap each other. The triangular portions 75a and 76a have circular holes which pivotably engage with the pivot shafts 78 and 78'. A tension spring 79 is hung between the spring hooks 75d and 76d, with the result that the supply reel side brake arm 75 is biased in the counterclockwise direction and the take-up reel side brake arm 76 is biased in the clockwise direction as seen in FIGS. 2 and 3. Thus, the brake shoes 77 and 77' are biased into engagement with the brake drums by the spring 79.

Two brake releasing means are provided for disengaging the brake shoes 77 and 77' from the brake drums 10a and 11a. The first brake releasing means includes a brake releasing lever 80 which engages with the pushing edge 64a and is operated according to the sliding movement of the slider 60, and actuates during the forward running mode or the reverse running mode in each of which the magnetic tape 71 is sandwiched between the capstan 45 and the pinch roller 49 and runs depending upon rotation thereof. The second brake releasing means includes an electromagnetic solenoid 82 which operates a brake control lever 85. The solenoid actuates during the tape loading mode and the AMS mode.

The brake releasing lever 80 is located near the front-left end of the sub-chassis 4. The brake releasing lever 80 comprises an essentially longitudinal section 80a, a U-shaped section 80b, and a projecting pin 80c as shown in FIG. 8. The U-shaped section 80b is formed at the rear side of the brake releasing lever 80 and downward near the center portion of the longitudinal section 80a. The U-shaped section 80b has two coaxially aligned circular holes which engage with a support shaft 81. The brake releasing lever is rotatably supported on the upper surface of the sub-chassis 4 by means of the support shaft pin 81 which projects upward from the upper surface of the sub-chassis 4 and passes through the two circular holes of the U-shaped section 80b. As set forth above, the left end of the brake releasing lever 80 engages with the pushing edge 64a of the slider 60 and is puched in the rear direction according to the sliding movement of the slider 60, thereby rotating the brake releasing lever 80 clockwise. The pin 80c formed at the right end of the brake releasing lever 80, slidably engages with the U-shaped notch 75e of the brake arms 75. The brake releasing lever 80 is biased by the tension of the spring 79.

In the non-loaded mode as shown in FIG. 2, the slider 60 is positioned in its first position thereof and the brake shoes 77 and 77' of the brake arms 75 and 76 are in contact with the respective brake drums 10a and 11a. In this position, the end of the brake releasing lever 80 is positioned near the rear end of the rectangular notch 64 of the slider 60. This position of the brake releasing lever 80 will be hereinafter referred to as the "braking position".

Conversely, when the slider 60 is moved from the first position to the position shown in FIG. 1, the pushing edge 64a of the rectangular notch 64 comes into contact with the left end of the brake releasing lever 80 and pushes the latter to the rear direction with the result that the brake releasing lever 80 rotates clockwise, causing the projecting pin 80c to push the rear edges of the forks 75b and 76b of the brake arms 75 and 76. As a result, the brake arm 75 rotates clockwise and the brake arm rotates counterclockwise, thereby disengaging the brake shoes 77 and 77' from the brake drums 10a and 11a. This position of the slider 60 will be hereinafter referred to as the "second position". As shown in FIG. 1, the brake shoes 77 and 77' of the brake arms 75 and 76 are kept at the non braking position.

As will be appreciated from the above, when the slider 60 is moved from the first position to the second position and the brakes are released.

The second brake releasing means comprises the solenoid 82. The solenoid 82 is secured on the upper surface of the sub-chassis 4 and located near the right end of the latter with the axially sliding connector rod 84 projecting frontwardly from a solenoid casing 83. The projecting section has an annular groove 84a near the end thereof. The piston rod 84 is normally biased forward by biasing force producing means (not shown). While the plunger 82 is not excited, the connector rod 84 is positioned as shown in FIG. 2. On the other hand, while the plunger 82 is excited, the connector rod 84 is brought into a solenoid casing 83 to the position shown in FIG. 5. As clearly seen in FIG. 5, the piston rod 84 is brought into the plunger casing 83.

The brake control lever 85 is provided on the front-right of sub-chassis 4. The brake control lever 85 has a semicircular pushing pin 86 projecting downward from its left end and a C-shaped connecting member 85a as best shown in FIG. 8. The brake control lever 85 also has a circular hole in its center section by which it is rotatably supported on a support shaft 87 which is projects upward from the upper surface of the sub-chassis 4 and is located near the front-right section of the take-up reel base 11. The semicircular pushing pin 86 of the brake control lever 85 can contact the rear edges of the prongs 75b and 76b of the brake arms 75 and 76. The C-shaped connecting member 85a of the brake control lever 85 engages with the annular groove 84a of the piston rod 84 in such a manner that the C-shaped connecting member 85a covers the upper side of the annular groove 84a.

In the tape non-loaded position shown in FIG. 2, the brake shoes 77 and 77' are in contact with the respective brake drums 10a and 11a and the pushing pin 86 of the brake control lever 85 is in light contact with or is near the rear edges of the prongs 75b and 76b of the brake arms 75 and 76.

When the solenoid 82 is excited, the connector rod 84 is drawn into the solenoid casing 83, thereby pushing the C-shaped connecting member 85a of the brake control lever 85 rearward. As a result, the brake control lever 85 rotates counterclockwise and the pushing pin 86 of the brake control lever 85 pushes the the rear edges of the prongs 75b and 76b of the brake arms 75 and 76 with the result that the brake arms 75 and 76 are moved to at the brake releasing position. In this way, while the solenoid 82 is excited, the brake shoes 77 and 77' are released from engagement with the brake drums 10a and 11a.

Since the pin 80c of the brake releasing lever 80 is always engaged with the U-shaped notch 75e of the brake arm 75, the brake releasing lever 80 is also moved to the brake releasing position in accordance with the clockwise rotational movement of the brake arm 75 dependent on the position of the connector rod 84.

On the other hand, as soon as the solenoid 82 is deactivated, the actuator rod 84 is pushed outwardly by the biasing force producing means, thereby causing the brake control lever 85 to rotate clockwise. As a result, the brake arms 75 and 76 return to the braking position due to tension from the tension spring 79, and thus the brake releasing lever 80 is returned to the braking position.

A back-tension arm 88 is provided near the rear end of the sub-chassis 4 to apply light friction to the brake drum 11a of the take-up reel base 11 in the tape reverse mode. The back-tension arm 88 has an essentially intermediate section 88a, a substantially C-shaped support section 88b, a shoe base 88c, a spring hook 88d, and a pushing strip 88e. The C-shaped support section 88b is formed at about the center of the intermediate section 88a. The shoe base 88c extends upward from the front-right end of the intermediate section 88a. The spring hook 88d extends downward from the rear-right end of the intermediate section 88a. The pushing strip 88e extends upward from the rear-left end of the intermediate section 88a. The C-shaped section 88b has two coaxially aligned circular holes in the upper and lower sections thereof by which the brake-tension arm 88 is rotationally supported on a support shaft 90. The support shaft 90 is provided essentially midway between the rear ends of the reel bases 10 and 11. A brake shoe 89 which can be operated into contact with the right-hand brake drum 11a of the take-up reel base 11 is secured on the front surface of the shoe base 88c. The brake shoe 89 is made of a felt material having a relatively high friction coefficient or the like. A spring support pin 91 is provided on the upper surface of the sub-chassis 4 and near the rear-right end of the right-hand reel base 11. A tension spring 92 hung between the spring support pin 91 and the spring hook 88d, biases the brake shoe 89 into contact with the rear end of the brake drum 11a as shown in FIG. 2. This position of the brake shoe 89 will be hereinafter referred to as the "contact position".

In this construction, when the magnetic tape 71 is run in the reverse direction while the brake shoe 89 of the back-tension arm 88 is in contact with the brake drum 11a, rotation of the reel from which the tape is being drawn, is slightly suppressed which results in the suitable back-tension being produced in the magnetic tape 71.

A back-tension control arm slider 93 is provided near the left side of the solenoid 82. The slider 93 is actuated by actuator 84 of the solenoid 82. In all modes except the tape stop mode and the tape reverse mode, the slider 93 functions to release the braking force caused by friction between the brake shoe 89 of the back-tension arm 88 and the left-hand brake drum 11a arm 88. As shown in FIG. 8, the L-shaped slider 93 has a longitudinal section 93a, a short arm 93b, and a C-shaped connecting member 93c. The longitudinal section 93a has a pair of rectangular holes 94 near its ends. The rectangular holes 94 slidably engage with two guide pins 95 projecting upward from the upper surface of the sub-chassis 4. The back-tension arm control slider 93 is guided by so as to be slidable forward or rearwards within a range defined by the length of the rectangular holes 94. The C-shaped connecting member 93c extends upward from the end of the short arm 93b which extends rightward from the front end of the longitudinal section 93a of the slider 93. The C-shaped connecting member 93c engages with the lower side of the annular groove 84a. As clearly seen in FIG. 6, the C-shaped connecting members 93c and 85a engage with the annular groove 84a in such a manner that the actuator rod 84 is sandwiched therebetween and the connecting member 85a engaged with the top half of the annular groove 84a.

As shown in FIGS. 1 to 3, when the solenoid 82 is not excited, the slider 93 lightly contacts or is adjacent to the right end of the shoe base 88c of the back-tension arm 88 at its rear edge. This position of the slider 93 will be hereinafter referred to as a "forward position".

When the plunger 82 is excited, the actuator rod 84 is drawn into the solenoid casing 83 with the result that the slider 93 is pushed rearward. As a result, the slider 93 is moved to the backward position in which the front edges of the rectangular holes 94 are in the vicinity of the respective guide pins 95. Therefore, the rear edge of the slider 93 pushes on the right end of the back-tension arm 88. This causes the back-tension arm 88 to rotate counterclockwise. In this manner, the brake shoe 89 of the back-tension arm 88 disengages and the braking force applied to the brake drum 11a of the take-up reel base 11 is released. This position of the brake shoe 89 will be hereinafter referred to as the "non-contact position".

As will be appreciated from the above, braking force is applied to the take-up reel base 11 by the brake shoe 89 when the solenoid 82 is not excited. On the other hand, the braking force is released when the solenoid 82 is excited.

When the solenoid 82 is deactivated the actuator rod 84 returns the slider 93 to the forward position and the biasing spring 92 returns the brake shoe 89 into engagement with the brake drum 11a.

A tension regulator regulating arm 96 is provided near the rear end of the left-hand reel base 10. As seen in FIG. 8, the regulating arm 96 has a square hole 96b near its center, a C-shaped section 96a, a finger 96c, and a regulating regulating pin 97 protruding upward from its left end and a pin 98 extending downward from its central portion. The C-shaped section 96a has two coaxially aligned circular holes in the upper and lower portions thereof.

A support shaft 99 is provided near the left side of the support shaft 90 of the back-tension arm 88. The support shaft 99 extends upward from the upper surface of the sub-chassis 4 to engage with the circular holes of the C-shaped section 96a for pivotably supporting the regulating arm 96.

A stopper pin 100 is provided near the left side of the support pin 99 to engage with the square hole 96b at its top section. As clearly seen in FIG. 7, the stopper pin 100 has an annular groove at the level of the finger 96c which serves to support a spring 101. A tension spring 101 is hung between the finger 96c and the annular groove of the stopper pin 100.

The lower section of the projecting pin 98 opposes the front surface of the pushing strip 88e of the back-tension arm 88. The regulating arm 96 is biased clockwise by the tension spring 101. Therefore, the front edge of the square hole 96b is biased against the stopper pin 100 as best shown in FIG. 1.

The upper section of the regulating pin 97 extends upward from the left end of the regulating arm 96, through the cut-out 2b and slidably contacts the cam surface of the trapozoidal cut-out 58a of the tension regulator arm 52.

When the back-tension arm 88 is positioned so that the brake shoe 89 is in contact with the brake drum 11a of the take-up reel base 11, the regulating arm 96 is so positioned that the front edge of the square hole 96b comes in contact with the stopper pin 100 as shown in FIG. 1. This position of the regulating arm 96 will be hereinafter referred to as the "regulating position". As seen in FIG. 1, in the regulating position of the regulating arm 96, the stopper pin 100 prevents the regulating arm 96 from rotating clockwise. In addition, the pin 98 opposes the front surface of the pushing strip 88e of a slight distance and the regulating pin 97 is positioned just behind the tension regulator arm control pin 63 of the slider 60.

When the back-tension arm 88 moves from the contact position to the non-contact position while the regulating arm 96 is positioned in the regulating position, the back-tension arm 88 rotates counterclockwise with the result that the pushing strip 88e pushes the pin 98 of the regulating arm 96 forwards thereby rotating, the regulating arm 96 counterclockwise against the tension of the tension spring 101. As a result, the regulating pin 97 slightly rotates counterclockwise. This position of the regulating arm will be hereinafter referred to as a "non-regulating position".

In the reverse running mode of the recording and/or reproducing apparatus, since the back-tension arm is positioned in the contact position as shown in FIG. 1, the regulating arm 96 is kept in the regulating position with the result that the contact between the oblique edge of the trapezoidal cut-out 58a of the tension regulator arm 52 and the regulating pin 97 of the regulating arm 96 prevents the tension regulator pin 54 of the tension regulator arm 52 from coming into contact with the magnetic tape 71.

On the other hand, in the forward running mode of the recording and/or reproducing apparatus, as the back-tension arm 88 is moved to the non-contact position of the brake shoe 89 as shown in FIG. 4, the regulating pin of the regulating arm 96 moves slightly counterclockwise so as to disengage from the cam surface of the trapezoidal cut-out 58a of the tension regulator arm 52 with the result that the tension regulator pin 56 of the tension regulator 54 comes into contact with the side surface of the magnetic tape 71.

The operational modes of the recording and/or reproducing apparatus of the preferred embodiment according to the present invention will be more clearly understood from the following detailed description.

In the non-loaded mode as shown in FIGS. 2 and 9:

The loading rings 24 and 25 are positioned in the non-loaded position;

The loading blocks 18 and 19 are positioned in the front ends of the elongated guide holes 14 and 15;

The tension regulator arm 52 is held in the initial position by the left-hand loading block 18;

The tension regulator arm control slider lever is positioned in the first position where the control lever 60 does not push the brake releasing lever 80;

The brake releasing lever 80 is positioned in the braking position;

The pinch roller 49 and the movable guide post is positioned in the initial position;

The electromagnetic solenoid 82 is not excited so the piston rod 84 is fully projected from the solenoid casing 83 and therefore the brake control lever 85 does not push the brake arms 75 and 76;

The back-tension arm control slider 93 does not engage the back-tension arm 88;

The brake arms 75 and 76 are held in the braking position in which the brake shoes 77 and 77' apply braking force to the respective reel bases 10 and 11;

The back-tension arm 88 is in the contact position in which the brake shoe 89 applies braking force to the take-up reel base 11;

The tension regulator regulating arm 96 is disposed in the regulating position.

In the stop mode, the loading rings 24 and 25 move from the non-loaded position to the loading completed position.

In the stop mode as shown in FIGS. 3 and 9:

The loading rings 24 and 25 are positioned in the loading completed position;

The loading blocks 18 and 19 are positioned in rear ends of the elongated guide holes 14 and 15;

The solenoid 82 is deactivated after completion of tape loading completion;

The brake arms 75 and 76 are returned to the braking position;

The back-tension arm control slider 93 is returned to the front position;

The back-tension arm 88 is returned to the contact position;

The tension regulator arm regulating arm 96 is returned to the regulating position;

The brake releasing lever 80 is returned to the braking position;

The slider 60 is moved to the first position;

The tension regulator arm 52 is held in the stand-by position in which the cam surface 58b comes into contact with the tension regulator arm control pin 63 of the slider 60;

The pinch roller 49 and the movable guide post 51 are actuated into the stand-by position;

The forward running mode is assumed when the recording and/or reproducing apparatus is operating in the PLAY mode, the RECORD mode, or the AMS mode in which the magnetic tape 71 is sandwiched between the capstan 45 and the pinch roller 49 and is running forward at the relative high speed.

The forward running mode is assumed by rotating the loading rings 24 and 25 in tape loading direction from the loading completed position and by exciting the solenoid 82. For example, from the stop mode, the loading motor 34 rotates forward in response to a play command and thereby rotates the loading rings 24 and 25 to the position shown in FIG. 4. This position of the loading rings 24 and 25 will be hereinafter referred to as a "play position". In this position, since the pinch roller pushing arm 39 of the upper loading ring 24 pushes the pinch roller arm 46 clockwise, the pinch roller 49 comes into contact with the capstan 45 in such a manner that the magnetic tape 71 is sandwiched therebetween. This position of the pinch roller 49 will be hereinafter referred to as the "full contact position". Furthermore, the pinch roller pushing arm 39 of the lower loading ring 25 pushes the horizontal strip 61 of the slider 60 rearward, thereby causing the slider 60 to be positioned in the second position shown in FIG. 4.

In the forward running mode as shown in FIGS. 4 and 9:

The loading rings 24 and 25 are positioned in the play position;

The loading blocks 18 and 19 are positioned in rear ends of the elongated guide holes 14 and 15;

The slider 60 is in the second position;

The brake releasing lever 80 is in the brake releasing position;

The solenoid 82 is excited at the same time the loading motor 34 rotates forward;

The back-tension arm control slider 93 is in the rear position;

The back-tension arm 88 is in the non contact position;

The tension regulator arm regulating arm 96 is in the non regulating position;

The brake arms 75 and 76 are returned to the non braking position;

The tension regulator arm 52 is rotated counterclockwise by the tension spring 57 into the tape contact position in which the tension regulator pin 54 comes into contact with a section of the magnetic tape 71 between the stationary guide posts 43 and 44.

As clearly seen in FIG. 4, in the tape contact position of the tension regulator arm 52, the tension regulator arm control pin 63 and the regulating pin 97 are positioned near the bottom edge of the trapezoidal cut-out 58a of the cam portion 58 with the result that the tension regulator arm 52 can freely move clockwise or counterclockwise.

As set forth above, in the forward mode, the braking force on the reel bases 10 and 11 is released mainly by the brake releasing lever 80. The magnetic tape 71 is sandwiched between the pinch roller 49 and the capstan 45. The braking force to the take-up reel base 11 due to the back-tension arm 88 is released.

The reverse running mode is assumed when the recording and/or reproducing apparatus is operating in the AMS mode in which the magnetic tape 71 is sandwiched between the capstan 45 and the pinch roller 49 and is running in reverse at a relatively high speed.

The reverse running mode is accomplished by rotating the loading rings 24 and 25 to the play position and by not exciting the electromagnetic plunger 82. For example, the loading motor 34 rotates forward in response to a command for the reverse mode and thereby rotates the loading rings 24 and 25 to the play position as shown in FIG. 1. Therefore, the pinch roller 49 comes into contact with the capstan 45 in such a manner that the magnetic tape 71 is sandwiched therebetween.

In the reverse running mode as shown in FIGS. 1 and 9:

The loading rings 24 and 25 are actuated to the play position;

The loading blocks 18 and 19 are actuated to rear ends of the elongated guide holes 14 and 15;

The slider 60 is actuated to the second position;

The brake releasing lever 80 is actuated to the brake releasing position;

The brake arms 75 and 76 are actuated to the non braking position with the result that the braking force to the reel bases 10 and 11 is released;

The solenoid 82 is not excited;

The back-tension arm control slider 93 is in the front position;

The back-tension arm 88 is positioned in the contact position with the result that braking force is applied to the brake drum 11a of the take-up reel base 11 by the brake shoe 89 of the back-tension arm 88;

The tension regulator arm regulating arm 96 is actuated to the regulating position;

The tension regulator arm 52 rotates counterclockwise unrestricted by the tension regulator arm control pin 63 of the slider 60, but the oblique edge of the trapezoidal cut-out 58a of the cam surface 58 comes into contact with the regulating pin 97 of the tension regulator regulating arm 96 as clearly shown in FIG. 1. The tension regulator pin 54 slightly disengages from the tape. This position of the tension regulator arm 52 will be hereinafter referred to as the "offset position".

As set forth above, in the reverse mode, the braking force to the reel bases 10 and 11 is released by the brake releasing lever 80. Control lever 85 however is the braking position due to the biasing means of the solenoid 82. The magnetic tape 71 is sandwiched between the pinch roller 49 and the capstan 45. Braking force is applied to the take-up reel base 11 by the back shoe 89. The tension regulator arm 52 is held in the offset position wherein the tension regulator pin 54 is out of contact with the magnetic tape 71. Thus, the suitable back-tension can be applied to the magnetic tape 71 in the reverse mode.

When the recording and/or reproducing apparatus is operating in the high speed AMS mode, the magnetic tape 71 is sandwiched between the capstan 45 and the pinch roller 49 and is running at several hundreds times the running speed of the reproducing mode.

The high-speed running mode is accomplished by rotating the loading rings 24 and 25 to the loading completed position and by exciting the solenoid 82. For example, the loading motor 34 rotates forward or backward in response to a command for the high-speed mode and thereby rotates the loading rings 24 and 25 to the loading completed position or returns them from the play position to the loading completed position as shown in FIG. 5. Therefore, the pinch roller 49 is positioned in the stand-by position slightly separated from the capstan 45.

In the high-speed running mode as shown in FIGS. 5 and 9:

The loading rings 24 and 25 are disposed in the loading completed position;

The loading blocks 18 and 19 are positioned in rear ends of the elongated guide holes 14 and 15;

The slider 60 is moved to the first position;

The tension regulator arm 52 is held in the stand-by position;

The solenoid 82 is excited;

The brake arms 75 and 76 are positioned in the non braking position with the result that the braking force of the brake shoe 89 is released by the brake control lever 85;

The brake releasing lever 80 is actuated to the brake releasing position in accordance with the rotational movement of the right-hand brake arm 75;

The back-tension arm control slider 93 is in the rear position;

The back-tension arm 88 is positioned in the non contact position with the result that the brake shoe 89 is disengaged from the brake drum 11a of the take-up reel base 11;

The tension regulator arm regulating arm 96 is actuated to the non regulating position by rotation of the back-tension arm 88;

As set forth above, in the high-speed mode, the braking force to the reel bases 10 and 11 is released only when the brake control lever 85 is rotated counterclockwise by the solenoid 82. The pinch roller 49 slightly separates from the capstan 45 and remains in the stand-by position. The brake shoe 89 of the back-tension arm 88 slightly separates from the outer periphery of the brake drum 11a of the take-up reel base 11. The tension regulator arm 52 is held in the stand-by position wherein the tension regulator pin 54 is out of contact with the magnetic tape 71.

As will be appreciated from the above, all the braking force by the brake arms 75 and 76 and the back-tension by the back-tension arm 88 and the tension by the tension regulator arm 52 are released in the high-speed mode.

The reproducing operation is performed in the forward running mode in which the capstan 45 rotates counterclockwise as shown in FIG. 4, this will be hereinafter referred to as the "forward feeding direction". The rotational speed of the capstan 45 corresponds to the aforementioned basic rotational speed. The take-up reel base 11 rotates in the clockwise direction in such a manner that the magnetic tape 71 does not become slack. The upper rotary drum 7 of the rotary head assembly 5 carrying magnetic heads 9 and 9' rotates at the predetermined speed. Thus, the magnetic tape 71 is fed in the forward direction at a predetermined speed, which will be hereinafter referred to as the "basic running speed", by the capstan 45 and the pinch roller 49. During the forward tape-feed at the basic running speed, the tension regulator arm 52 applies the suitable back-tension to the magnetic tape 71 at a point between the position of the capstan 45 and the supply reel 72. In this way, the magnetic heads 9 and 9' can read data stored in the track of the magnetic tape 71 with the result that the data can be reproduced by the recording and/or reproducing apparatus 1.

The AMS (auto music scanning) operation is performed as follows.

First, the record and/or recording apparatus 1 operates in the high-speed running mode. As soon as the ID code recorded in the track of the tape 71 is detected during the high-speed running mode, the apparatus 1 operates alternately in the reverse running mode or the forward running mode until the magnetic tape 71 stops with its ID code region arranged adjacent to the magnetic head. Subsequently, the reproducing operation is performed.

The AMS operation is performed as set forth above in three running modes, namely, the high-speed running mode, the reverse running mode, and the forward running mode. In the high-speed running mode, the tape runs at essentially three hundred times the basic tape running speed. This search of the ID code in the high-speed running mode, will be hereinafter referred to as the "high-speed search". In the high-speed search, the ID code region of the tape 71 inevitably overruns the magnetic head of the upper rotary drum 7 due to inertia of the reel and the reel base rotating to wind it, after which the tape 71 is returned in the opposite direction at a medium speed corresponding to essentially sixteen times the basic tape running speed and the ID code is searched at the medium speed in the reverse or forward running mode, will be hereinafter referred to as the "medium-speed search". If the magnetic tape 71 stops with its ID code region appropriately arranged on the magnetic head after the medium-speed search, the reproducing operation of the recording and/or reproducing apparatus 1 is executed immediately after this. However, if the ID code region of the magnetic tape 71 again overruns the magnetic head, a subsequent search is performed immediately at a relatively low speed in the opposite running direction. This search of the ID signal at the low speed will be hereinafter referred to as the "low-speed search".

In the high-speed search, one of the supply and take-up reel bases 10 and 11 is driven at high speed according to whether the ID code of the desired tune in the tape 71 is positioned at the supply reel side relative to the magnetic head or at the take-up reel side relative thereto. For example, the take-up reel base 11 is driven clockwise to wind the tape 71 if the ID code is at the supply reel 72 side. Conversely, the supply reel base 10 is driven counterclockwise to wind it if the ID code is in the take-up reel 73 side. At this time, the upper rotary drum 7 carrying the magnetic heads 9 and 9' rotate at an increased speed determined according to the speed of the tape 71.

In the medium-speed search, the recording and/or reproducing apparatus 1 is operated in the forward or reverse running mode as described above. For example, the apparatus 1 is operating in the forward running mode after the high-speed search has been performed in the tape reverse running mode. The capstan 45 is then rotated at essentially sixteen times the basic rotational speed in the tape forward-feed direction. Therefore, the magnetic tape 71 is fed in the forward running direction by rotational movement of the capstan 45 and pinch roller 49 at essentially sixteen times the basic tape running speed while the tension regulator pin 54 is applying back-tension to the magnetic tape 71. Inversely, the apparatus 1 is operated in the reverse running mode after the high-speed search has been performed in the tape forward running mode. The capstan 45 is then rotated at essentially sixteen times the basic rotational speed in the reverse-feed direction. Therefore, the magnetic tape 71 is fed in the reverse running direction by rotational movement of the capstan 45 and the pinch roller 49 at essentially sixteen times the basic tape running speed while the back-tension arm 88 is applies back-tension to the magnetic tape 71. After this, as soon as the ID code is detected, the rotational movement of the capstan 45 is stopped with the result that the magnetic tape run is stopped. In this medium-speed search, since the magnetic tape 71 is running at slower speed than the high-speed search and the back-tension is normally applied thereto, the desired ID code region of the track of the tape 71 stops at or slightly overruns the magnetic head of the upper rotary drum 7 of the rotary head assembly 5. If the ID code region slightly overruns the magnetic head, the magnetic tape 71 is run slowly in the opposite direction and a low-speed search is soon performed. If the ID code region stops on the head, the reproducing operation is executed at once.

In the low-speed search, the recording and/or reproducing apparatus 1 is operated in the forward or reverse running mode as described above. For example, the apparatus 1 is operating in the reverse running mode after the medium-speed search has been performed in the tape forward running mode. The capstan 45 is then rotated at essentially three times the basic rotational speed in the tape reverse-feed direction. Therefore, the magnetic tape 71 is fed in the reverse running direction by rotational movement of the capstan 45 and pinch roller 49 at essentially three times the basic tape running speed while the back-tension arm 88 applies the back-tension to the magnetic tape 71. Conversely, when the apparatus 1 is operated in the forward running mode after the medium-speed search has been performed in the tape reverse running mode. The capstan 45 is then rotated in the forward-feed direction at essentially three times the basic rotational speed. Therefore, the magnetic tape 71 is fed in the forward running direction by rotational movement of the capstan 45 and the pinch roller 49 at the essentially three times of the basic tape running speed while the tension regulator pin 54 applies back-tension to the magnetic tape 71. As soon as the ID code is detected, the rotational movement of the capstan 45 is stopped at once with the result that the magnetic tape running is stopped. In this low-speed search, since the magnetic tape 71 is run at a slower speed than during the medium-speed search and the back-tension is applied thereto, the desired ID code region of the track of the tape 71 can be stopped directly on the magnetic head of the upper rotary drum 7 of the rotary head assembly 5 at the moment of detection of the ID code. After this, the reproducing operation is executed.

Although the present invention has been disclosed in terms of digital audio tape recorders, it is not intended to limit the scope of the invention to such recording and/or reproducing apparatus. The invention may be embodied in other specific forms without departing from spirit or essential characteristics thereof. Therefore, the invention should be understood in all respects as defined by the appended claims rather than by the foregoing description and all modifications which come within the meaning and range of equivalency of the claims are therefore intended to be embraced therein.

What is claimed is:

1. A recording and/or reproducing apparatus for a magnetic tape cassette comprising:
   a capstan rotatable about its axis clockwise and counterclockwise;
   a pinch roller rotatably cooperating with said capstan to feed a magnetic tape wound on a pair of tape reels housed in a cassette casing of said magnetic tape cassette;
   reel base means for receiving said magnetic tape cassette to drivingly cooperate therewith, said reel base means including a pair of reel bases engageable with said pair of tape reels;
   tape loading means for extracting said tape from said tape cassette;
   braking means associated with said pair of reel bases for applying braking force onto said pair of reel bases so as to restrict rotation thereof;
   first means engageable with a first link member to release said braking force in a tape load mode wherein said tape is loaded by said tape loading means and in a first operational mode wherein said magnetic tape is run at a predetermined first speed by either of said pair of reel base respectively in forward and reverse directions of said tape;
   second means for releasing said braking force in second and third operational modes wherein said magnetic tape is fed by rotation of said capstan and pinch roller respectively in said forward and reverse directions at a predetermined second speed slower than said first speed;
   said first means including an electromagnetic solenoid excited in the first operational mode and the second operational mode;

said second means associated with said loading means in such a manner as to release said braking force in the second and third operational modes; and third means including a second link member engageable with said first means, said third means for applying friction onto either one of said pair of reel bases to apply back-tension to said magnetic tape between said capstan disposed downstream of a running direction of said magnetic tape and said one of reel bases rotating in order to supply said magnetic tape in the third operational mode.

2. A recording and/or reproducing apparatus as set forth in claim 1, wherein said electromagnetic solenoid has a solenoid casing and an axially sliding connector rod projecting outwardly from said casing.

3. A recording and/or reproducing apparatus as set forth in claim 2, wherein said first link member comprises a lever pivotable in accordance with movement of said connector rod.

4. A recording and/or reproducing apparatus as set forth in claim 3, wherein said second link member comprises a first slider being movable with said connector rod.

5. A recording and/or reproducing apparatus as set forth in claim 1, which further comprises a rotary head having magnetic heads rotatable with a rotary drum or said magnetic tape cassette.

6. A recording and/or reproducing apparatus as set forth in claim 5, wherein said loading means comprises a pair of loading rings and a pair of tape guide blocks for drawing out some of said magnetic tape during said tape load mode and being capable of moving in the vicinity of said rotary head to bring said magnetic tape into contact with said rotary head.

7. A recording and/or reproducing apparatus as set forth in claim 6, wherein said second means is actuated by rotational movement of said loading ring from a first position in which said braking force is applied onto said reel bases to a second position in which said braking force is released.

8. A recording and/or reproducing apparatus as set forth in claim 7, wherein said second means comprises a second slider engaging with at least one of said loading ring and a pivotable lever engagable with said second slider and said braking means.

9. A recording and/or reproducing apparatus as set forth in claim 8, wherein said loading means includes a pushing arm by which said pinch roller comes into contact with said capstan.

10. A recording and/or reproducing apparatus as set forth in claim 8, wherein said second means comprises a second slider engaging with one of said loading rings and a pivotable lever engageable with both said second slider and said braking means.

11. A recording and/or reproducing apparatus as set forth in claim 10, wherein the other loading ring includes a push arm by which said pinch roller comes into contact with said capstan.

12. A recording and/or reproducing apparatus including a rotary head assembly having a rotary drum and at least one magnetic head mounted on the rotary drum comprising:

a capstan rotatable about its axis clockwise and counterclockwise;

a pinch roller rotatably cooperating with said capstan to feed a magnetic tape wound on a pair of tape reels housed in a cassette casing of a magnetic tape cassette;

tape loading means for extracting said tape from said tape cassette such that said tape comes into contact with said rotary drum;

a pair of reel bases receiving said tape cassette to drivingly cooperate therewith;

braking means associated with said reel bases for applying braking force onto both of said reel bases in a stop mode wherein rotation of both of said reels is stopped;

first means for releasing said braking force in a tape load mode wherein said tape is loaded by said tape loading means and in a high-speed running mode including fast-forward and rewind modes wherein said tape is driven at a predetermined first speed by one of said reel bases acting as a take-up reel base respectively in forward and reverse direction of said tape;

second means for releasing said braking force in a normal running mode including forward and reverse modes wherein said tape is fed by rotation of said capstan and said pinch roller respectively in said forward and reverse directions at a predetermined second speed slower than said first speed;

said first means including an electromagnetic solenoid excited in the high-speed running mode and the forward mode;

said second means associated with said loading means in such a manner as to release said braking force in the normal running mode;

tension regulator means for coming into contact with said tape and for regulating tension of said tape between said capstan and one of said reels acting as a supply reel in the forward mode;

back-tension means associated with said solenoid for applying friction to one of said reel bases acting as a supply reel base in order to regulate backtension of said tape between said capstan and one of said reels acting as a supply reel in the reverse mode; and tension regulator control means associated with said solenoid for controlling said tension regulator means to move out of contact with said tape in the reverse mode.

13. A recording and/or reproducing apparatus as set forth in claim 12, wherein said electromagnetic solenoid has a solenoid casing and an axially sliding connector rod projecting outwardly from said casing.

14. A recording and/or reproducing apparatus as set forth in claim 13, wherein said connector rod engages with a first link member formed with a lever pivotable according to movement thereof.

15. A recording and/or reproducing apparatus as set forth in claim 14, wherein said connector rod engages with a second link member formed with a first slider movable therewith.

16. A recording and/or reproducing apparatus as set forth in claim 12, wherein said loading means comprises a pair of loading rings and a pair of tape guide blocks, said blocks normally entering into a recess of said tape cassette to draw out some of said tape, said blocks moving in the vicinity of said rotary head to bring some of said tape into contact with said rotary head in said tape load mode.

17. A recording and/or reproducing apparatus as set forth in claim 16, wherein said second means is actuated in synchronization with rotational movement of one of said loading rings from a first position in which said braking force is applied onto said reel bases to a second position in which said braking force is released.

18. A recording and/or reproducing apparatus as set forth in claim 17, wherein said second means comprises a second slider engaging with one of said loading rings and a pivotable lever engageable both of with said second slider and said braking means.

19. A recording and/or reproducing apparatus as set forth in claim 18, wherein the other loading ring includes a pushing arm by which said pinch roller comes into contact with said capstan.

20. A recording and/or reproducing apparatus as set forth in claim 12, wherein said tension regulator means comprises a tension regulator arm pivotable about its pivot shaft and a tension regulator pin through which said tension regulator arm applies tension to said tape while said recording and/or reproducing apparatus is in the forward mode.

21. A recording and/or reproducing apparatus as set forth in claim 20, wherein said tension regulator control means including a third link member engageable with said tension regulator arm to control the angular position of said tension regulator arm while said recording and/or reproducing apparatus is in the reverse mode.

22. A recording and/or reproducing apparatus as set forth in claim 21, wherein said second means engages with said tension regulator arm to control the angular position of said tension regulator arm while said recording and/or reproducing apparatus is in the stop mode and the high-speed running mode.

23. A recording and/or reproducing apparatus as set forth in claim 22, wherein said back-tension means comprises a pivotable arm biased against said take-up reel base by a spring so as to apply light friction thereto.

24. A recording and/or reproducing apparatus including a rotary head assembly having a rotary drum and at least one magnetic head mounted on the rotary drum comprising:
- a capstan rotatable about its axis clockwise and counterclockwise;
- a pinch roller rotatably cooperating with said capstan to feed a magnetic tape wound on a pair of tape reels housed in a cassette casing of a magnetic tape cassette;
- tape loading means extracting said tape from said tape cassette such that said tape comes into contact with said rotary drum, said loading means including a pair of rotatable loading rings;
- a pair of reel bases receiving said tape cassette to drivingly cooperate therewith;
- braking means associated with said reel bases for applying braking force onto both of said reel bases in a stop mode wherein rotation of both of said reels is stopped;
- first means for releasing said braking force in a tape load mode wherein said tape is loaded by said tape loading means and in a high-speed running mode including fast-forward and rewinding modes wherein said tape is driven at a predetermined first speed by one of said reel bases acting as a take-up reel base respectively in forward and reverse directions of said tape;
- second means for releasing said braking force in a normal running mode including forward and reverse modes wherein said tape is fed by rotation of said capstan and said pinch roller respectively in said forward and reverse directions at a predetermined second speed slower than said first speed;
- said first means including an electromagnetic solenoid excited in the high-speed running mode and the forward mode; and
- said second means associated with said loading means in such a manner as to release said braking force in synchronization with rotational movement of one of said loading rings in said normal running mode.

25. A recording and/or reproducing apparatus as set forth in claim 24, wherein said electromagnetic solenoid has a solenoid casing and an axially sliding connector rod projecting outwardly from said casing.

26. A recording and/or reproducing apparatus as set forth in claim 25, wherein said connector rod engages with a first link member formed with a lever pivotable according to movement thereof.

27. A recording and/or reproducing apparatus as set forth in claim 26, wherein said connector rod engages with a second link member formed with a first slider slidable therewith.

28. A recording and/or reproducing apparatus as set forth in claim 24, wherein said loading means comprises a pair of tape guide blocks, said blocks normally entering into a recess of said tape cassette to draw out some of said tape, said blocks moving in the vicinity of said rotary head to bring said tape into contact with said rotary head in said tape load mode.

29. A recording and/or reproducing apparatus as set forth in claim 28, wherein said second means are actuated by the rotational movement of one of said loading rings from a first position in which said braking force is applied onto said reel bases to a second position in which said braking force is released.

30. A recording and/or reproducing apparatus as set forth in claim 24, wherein said tape loading means is associated with said pinch roller in such a manner as to come drivenly in contact with said capstan in synchronization with rotational movement of the other loading ring in said normal running mode.

* * * * *